(12) United States Patent
Cloud et al.

(10) Patent No.: US 8,770,515 B1
(45) Date of Patent: Jul. 8, 2014

(54) MOVEMENT ASSISTANCE SYSTEM FOR A STORAGE BIN

(75) Inventors: Mark LeQuesne Cloud, Seattle, WA (US); Christopher Lyle Schwitters, Bothell, WA (US); Kwun-Wing Cheung, Shoreline, WA (US); Paul Andrew Kinzer, Bothell, WA (US)

(73) Assignee: The Boeing Company, Chicago, IL (US)

( * ) Notice: Subject to any disclaimer, the term of this patent is extended or adjusted under 35 U.S.C. 154(b) by 594 days.

(21) Appl. No.: 12/792,009

(22) Filed: Jun. 2, 2010

(51) Int. Cl.
*B64D 11/00* (2006.01)

(52) U.S. Cl.
USPC .............. 244/118.5; 292/24; 292/26; 292/28

(58) Field of Classification Search
USPC ........... 244/118.5; 292/24, 26, 28, 30, 44, 50, 292/53, 141, 138, 139, 143
See application file for complete search history.

(56) References Cited

U.S. PATENT DOCUMENTS

| | | | | |
|---|---|---|---|---|
| 4,275,913 A * | 6/1981 | Marcus | | 296/37.1 |
| 4,552,399 A * | 11/1985 | Atarashi | | 296/37.12 |
| 4,629,228 A * | 12/1986 | Marko et al. | | 292/165 |
| 4,637,642 A * | 1/1987 | Stoecker | | 292/129 |
| 5,037,154 A * | 8/1991 | Senba et al. | | 296/37.16 |
| 5,244,269 A * | 9/1993 | Harriehausen et al. | | 312/247 |
| 5,603,535 A * | 2/1997 | Antonucci et al. | | 292/128 |
| 5,823,583 A * | 10/1998 | Sandhu et al. | | 292/173 |
| 5,988,565 A * | 11/1999 | Thomas et al. | | 244/118.1 |
| 6,899,299 B2 * | 5/2005 | Ritts | | 244/118.5 |
| 7,090,314 B2 | 8/2006 | Burrows et al. | | |
| 7,118,068 B2 | 10/2006 | Graf et al. | | |
| 7,552,954 B2 * | 6/2009 | Rozo et al. | | 292/336.3 |
| 7,588,211 B2 * | 9/2009 | Granzeier et al. | | 244/118.5 |
| 2001/0011692 A1 * | 8/2001 | Sprenger et al. | | 244/118.5 |
| 2003/0146629 A1 * | 8/2003 | Cheever | | 292/167 |
| 2005/0230541 A1 | 10/2005 | Graf et al. | | |
| 2007/0013202 A1 * | 1/2007 | Tompson | | 296/37.1 |
| 2008/0035794 A1 | 2/2008 | Steinbeck et al. | | |
| 2011/0140462 A1 * | 6/2011 | Lin et al. | | 292/143 |

* cited by examiner

*Primary Examiner* — Tien Dinh
*Assistant Examiner* — Justin Benedik
(74) *Attorney, Agent, or Firm* — Yee & Associates, P.C.

(57) ABSTRACT

A method and apparatus for assisting movement of a bin into a closed position. An assistance system associated with the bin may be activated in response to a manipulation of a switch associated with the bin. The assistance system may comprise a biasing system and a switch. The biasing system may be configured to generate a force in a direction towards a closed position for the bin. A switch may be connected to the biasing system and configured to activate the biasing system when a selected amount of weight is present in the bin. The force in the direction towards the closed position for the bin may be generated in response to activating the assistance system.

17 Claims, 21 Drawing Sheets

MOVEMENT ASSISTANCE SYSTEM FOR A STORAGE BIN

BACKGROUND INFORMATION

1. Field

The present disclosure relates generally to aircraft and, in particular, to storage bins in an aircraft. Still more particularly, the present disclosure relates to a method and apparatus for assisting in closing an overhead storage bin in an aircraft.

2. Background

The cabin of an aircraft may have a number of different types of structures. For example, without limitation, a cabin may have seats, overhead storage bins, passenger service units, closets, and other types of structures. In preparing for takeoff, the cabin crew may perform a number of different operations. For example, cabin crew members may ensure that the seats are in upright positions for takeoff. Additionally, cabin crew members also may close the bins for the overhead storage. In some cases, some items may be placed in closets rather than overhead bins. The cabin crew may take these items from passengers for storage in closets. These and other operations may be performed in preparing an aircraft for takeoff. Performing these operations may take time and require physical strength in the cabin crew members. For example, when an overhead storage bin is full of luggage or other passenger items, the overhead storage bin may become heavier and more difficult to close.

Thus, it would be advantageous to have a method and apparatus that takes into account at least some of the issues discussed above, as well as possibly other issues.

SUMMARY

In one advantageous embodiment, an apparatus may comprise a biasing system and a switch. The biasing system may be configured to generate a force in a direction towards a closed position for the bin. The switch may be connected to the biasing system and configured to activate the biasing system when a selected amount of weight is present in the bin.

In another advantageous embodiment, an overhead storage system in an aircraft may comprise a biasing system, a switch, a bin housing, a bin, a housing, a number of rods, a carriage, and a reset mechanism. The biasing system may be configured to be connected to a bin and generate a force in a direction towards a closed position for the bin. The biasing system may comprise a bearing member, a biasing unit, and an activation system. The bearing member may be configured to slide against a cam associated with the bin housing for the bin. The biasing unit may be configured to move the bearing member to slide against the cam associated with the bin housing from a first position to a second position on the cam associated with the bin housing in which the force may be applied on the bin in the direction to rotate the bin about an axis towards the closed position for the bin. Movement of the bin from the closed position to an open position may store energy in the biasing unit in which the energy may be used to move the bearing member on the cam associated with the bin housing. The activation system may be connected to the biasing unit and configured to cause the biasing unit to move the bearing member when the switch is manipulated and a selected weight is present in the bin. The activation system may comprise an arm and a latch. The arm may extend from the bearing member and may have a position when the selected amount of weight is present in the bin. The latch may be connected to a cable by an elongate member associated with the latch. The latch may be configured to disengage from the arm when the switch is manipulated and the arm is in the position in which the biasing unit is configured to move the bearing member when the latch is disengaged from the arm. The switch may be connected to the biasing system by the cable. The switch may be configured to activate the biasing system when the selected amount of weight is present in the bin. The bin may be connected to the bin housing and may be moveable between the open position and the closed position. The housing may be associated with the biasing unit and the latch. The carriage may be moveably connected to the number of rods. The bearing member and the arm extending from the bearing member may be associated with the carriage. The biasing unit may be connected to the carriage. The reset mechanism may be configured to move the latch to engage the arm after being disengaged from the arm when the bin is moved to the closed position.

In yet another advantageous embodiment, a method may be provided for moving a bin. An assistance system associated with the bin may be activated in response to a manipulation of a switch associated with the bin. The assistance system may comprise a biasing system and a switch. The biasing system may be configured to generate a force in a direction towards a closed position for the bin. The switch may be connected to the biasing system and configured to activate the biasing system when a selected amount of weight is present in the bin. The force in the direction towards the closed position for the bin may be generated in response to activating the assistance system.

In still yet another advantageous embodiment, a method may be provided for providing assistance in moving a bin in an overhead storage system in an aircraft to a closed position. An assistance system associated with the bin may be activated in response to a manipulation of a switch associated with the bin. The assistance system may comprise a biasing system and a switch. The biasing system may be configured to generate a force in a direction towards the closed position for the bin. The biasing system may comprise a bearing member, a biasing unit, an activation system, and a latch. The bearing member may be configured to slide against a portion of a bin housing for the bin. The biasing unit may be configured to move the bearing member to slide against the portion of the bin housing from a first position to a second position on the portion of the bin housing. The force may be applied on the bin in the direction to rotate the bin about an axis towards the closed position for the bin. The activation system may be connected to the biasing unit and configured to cause the biasing unit to move the bearing member when the switch is manipulated and a selected weight is present in the bin. The activation system may comprise an arm extending from the bearing member. The arm may have a position when the selected amount of weight is present in the bin. The latch may be configured to disengage from the arm when the switch is manipulated and the arm is in the position. The biasing unit may be configured to move the bearing member when the latch is disengaged from the arm. The switch may be connected to the biasing system and configured to activate the biasing system when the selected amount of weight is present in the bin. The force in the direction towards the closed position for the bin may be generated in response to activating the assistance system. The latch may be moved to engage the arm in response to the bin being moved to the closed position. The latch may be moved by a reset mechanism. Energy may be stored in the biasing unit when the bin is moved from the closed position to an open position. The energy may be used to move the bearing member.

The features, functions, and advantages may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
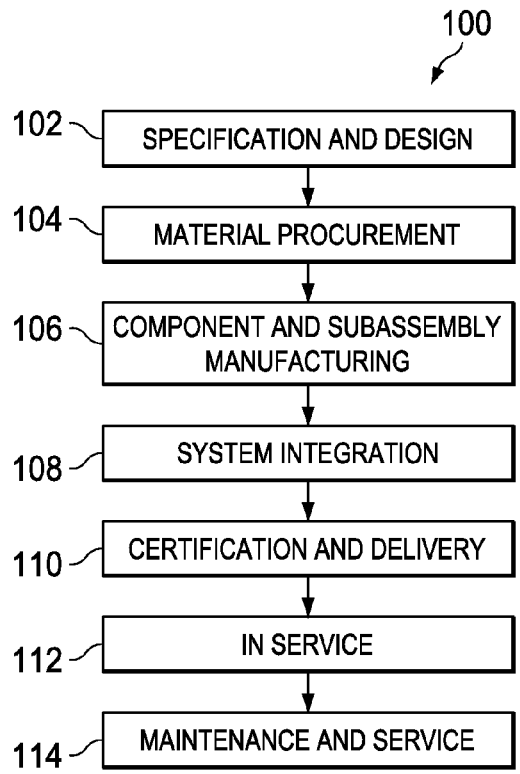
FIG. 1 is an illustration of an aircraft manufacturing and service method in accordance with an advantageous embodiment.
Figure 2:
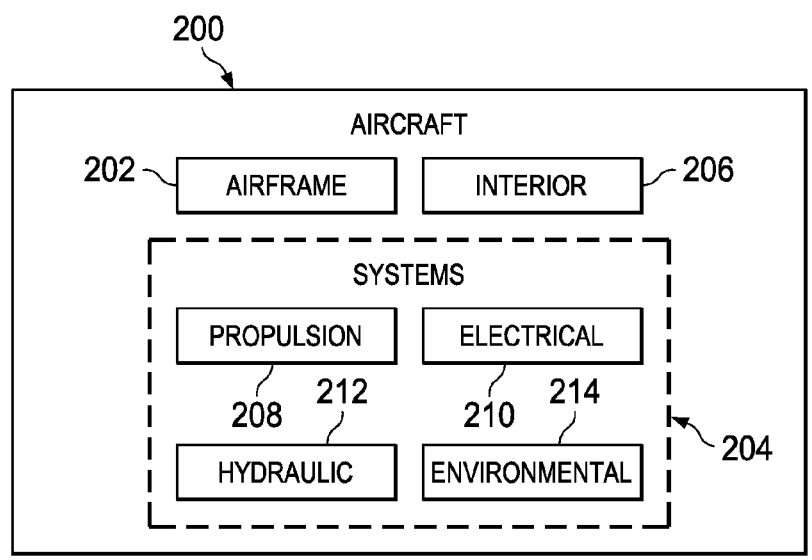
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1.

The different advantageous embodiments recognize and take into account a number of considerations. For example, the different advantageous embodiments recognize and take into account that as more luggage is placed in the bins for overhead storage and as the bins are designed to carry more pieces of luggage, the amount of force needed to close the bins may increase. For example, without limitation, a bin may typically require from about 30 pounds to about 60 pounds of force to close. The different advantageous embodiments recognize and take into account that when a cabin crew member may have to close 10, 20, or 30 bins, this process may be time-consuming and may increase fatigue in crew members.

Thus, the different advantageous embodiments provide a method and apparatus for providing assistance in closing bins. In one advantageous embodiment, an apparatus comprises a biasing system and a switch. The biasing system is configured to generate force in a direction towards a closed position for the bin. The switch is configured to activate the biasing system when a selected amount of weight is present in the bin.

Figure 3:
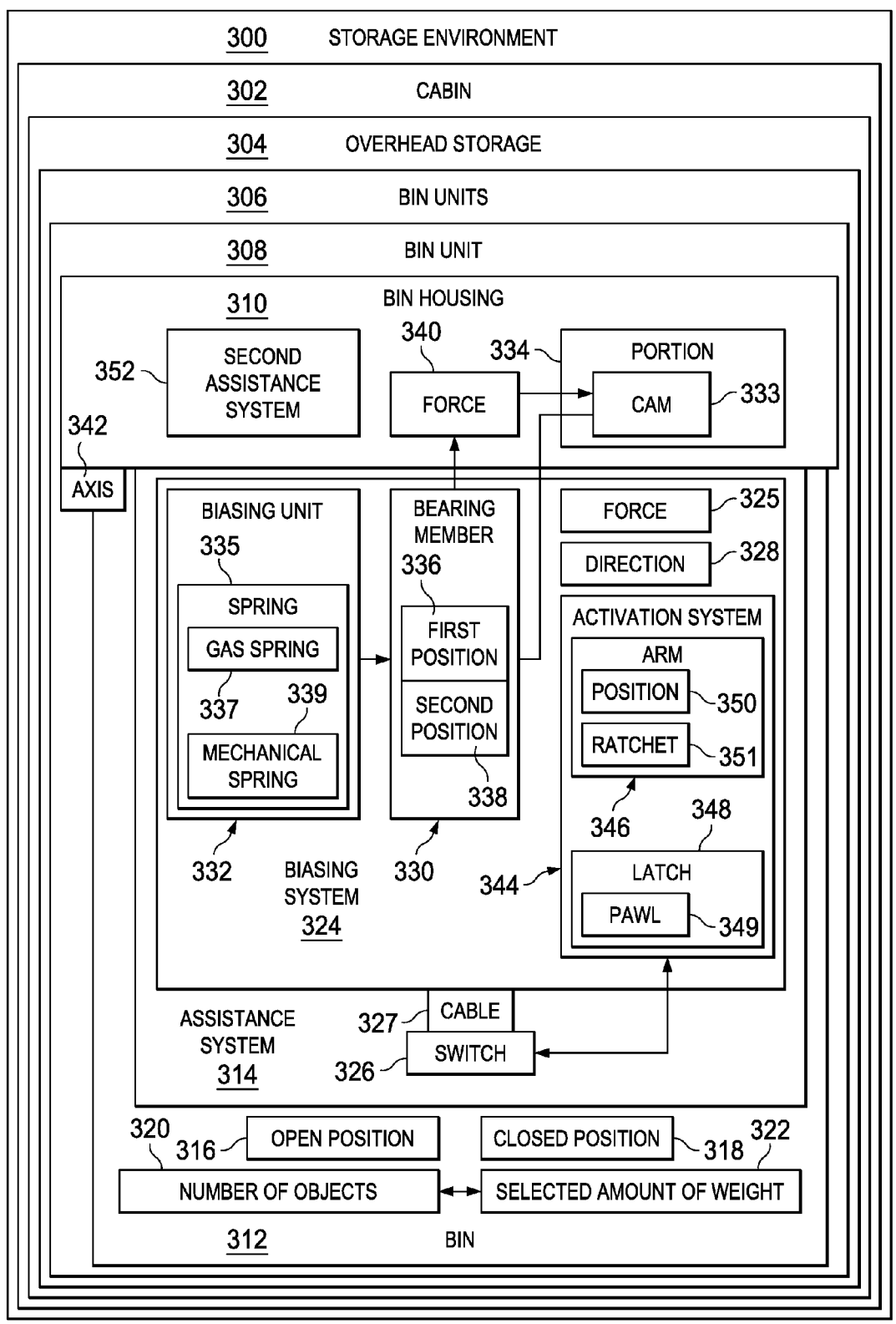
FIG. 3 is an illustration of a storage environment in accordance with an advantageous embodiment.

With reference now to FIG. 3, an illustration of a storage environment is depicted in accordance with an advantageous embodiment. In this example, storage environment 300 includes cabin 302 with overhead storage 304. Cabin 302 may be found in a platform, such as, for example, without limitation, aircraft 200 in FIG. 2.

As depicted, overhead storage 304 may include bin units 306. Bin unit 308 in bin units 306 may comprise bin housing 310, bin 312, and assistance system 314. Bin 312 may be moved between opened position 316 and closed position 318 in these examples. The movement of bin 312 into closed position 318 may be made with assistance from assistance system 314.

The assistance provided by assistance system 314 may be to reduce the amount of force needed to close bin 312 or to provide substantially all of the force needed to close bin 312. In other words, assistance system 314 may be used to assist a cabin crew member in closing bin 312 or close bin 312 for the cabin crew member.

In these illustrative examples, assistance system 314 may be activated when number of objects 320 has selected amount of weight 322 in bin 312. Number of objects 320 may include, for example, without limitation, luggage, passenger items, and/or other suitable items to be stored in bin 312.

In this illustrative example, assistance system 314 may comprise biasing system 324 and switch 326. Biasing system 324 may be configured to be connected to bin housing 310 for bin 312 in bin unit 308. Biasing system 324 may generate force 325 in direction 328 towards closed position 318 for bin 312 when selected amount of weight 322 is present in bin 312.

In these illustrative examples, switch 326 may be connected to biasing system 324. For example, without limitation, switch 326 may be connected to biasing system 324 by cable 327. Switch 326 may be configured to activate biasing system 324 when selected amount of weight 322 is present in bin 312.

Biasing system 324 may comprise bearing member 330 and biasing unit 332. Bearing member 330 may be a structure configured to slide against portion 334 of bin housing 310. Biasing unit 332 may be configured to move bearing member 330 to slide against portion 334 of bin housing 310 from first position 336 to second position 338 on portion 334 of bin housing 310.

In this illustrative example, portion 334 of bin housing 310 may include cam 333. For example, without limitation, bearing member 330 may be configured to slide against cam 333 attached to bin housing 310. Cam 333 may form portion 334 of bin housing 310. Additionally, cam 333 may be a structure configured to allow bin 312 to rotate from open position 316 to closed position 318 and from closed position 318 to open position 316.

As depicted in this example, biasing unit 332 may take the form of spring 335. Spring 335 may be, for example, gas spring 337, mechanical spring 339, or some other suitable type of spring.

In this depicted example, bearing member 330 may apply force 340 on bin 312 in direction 328 towards closed position 318 for bin 312. In these examples, the movement of bearing member 330 may apply force 340 on cam 333 such that bin 312 may rotate about axis 342 towards closed position 318.

As illustrated, biasing system 324 also may include activation system 344. Activation system 344 may be connected to biasing unit 332.

As used herein, when a first component is connected to a second component, the first component may be connected to the second component without any additional components. The first component also may be connected to the second component by one or more other components. For example, one electronic device may be connected to a second electronic device without any additional electronic devices between the first electronic device and the second electronic device. In some cases, another electronic device may be present between the two electronic devices connected to each other.

As illustrated, activation system 344 may include arm 346 and latch 348. In this illustrative example, arm 346 may take the form of ratchet 351. Latch 348 may take the form of pawl 349.

Arm 346 may extend from bearing member 330. Arm 346 may have position 350 when selected amount of weight 322 is present in bin 312. Latch 348 may be configured to disengage from arm 346 when switch 326 is manipulated and arm 346 is in position 350. Biasing unit 332 may be configured to move bearing member 330 when latch 348 is disengaged from arm 346 in these illustrative examples. In particular, biasing unit 332 may move bearing member 330 to second position 338 when latch 348 is disengaged from arm 346.

The illustration of storage environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, bin unit 308 may have second assistance system 352 in addition to assistance system 314. Second assistance system 352 may be located on the opposite of bin unit 308 as compared to assistance system 314. Further, second assistance system 352 may provide additional assistance for closing bin 312 in bin unit 308 when the weight of number of objects 320 is larger than some selected weight.

Further, in other advantageous embodiments, biasing system 324 and switch 326 may be connected to each other by some mechanism other than cable 327. As one illustrative example, biasing system 324 and switch 326 may be connected to each other by a number of elongate members and joints in which the elongate members may be rotatable around the joints.

In some illustrative examples, switch 326 may be configured to be manipulated once selected amount of weight 322 is present in bin 312. In this manner, biasing system 324 may be activated once selected amount of weight 322 is present in bin 312.

Figure 4:
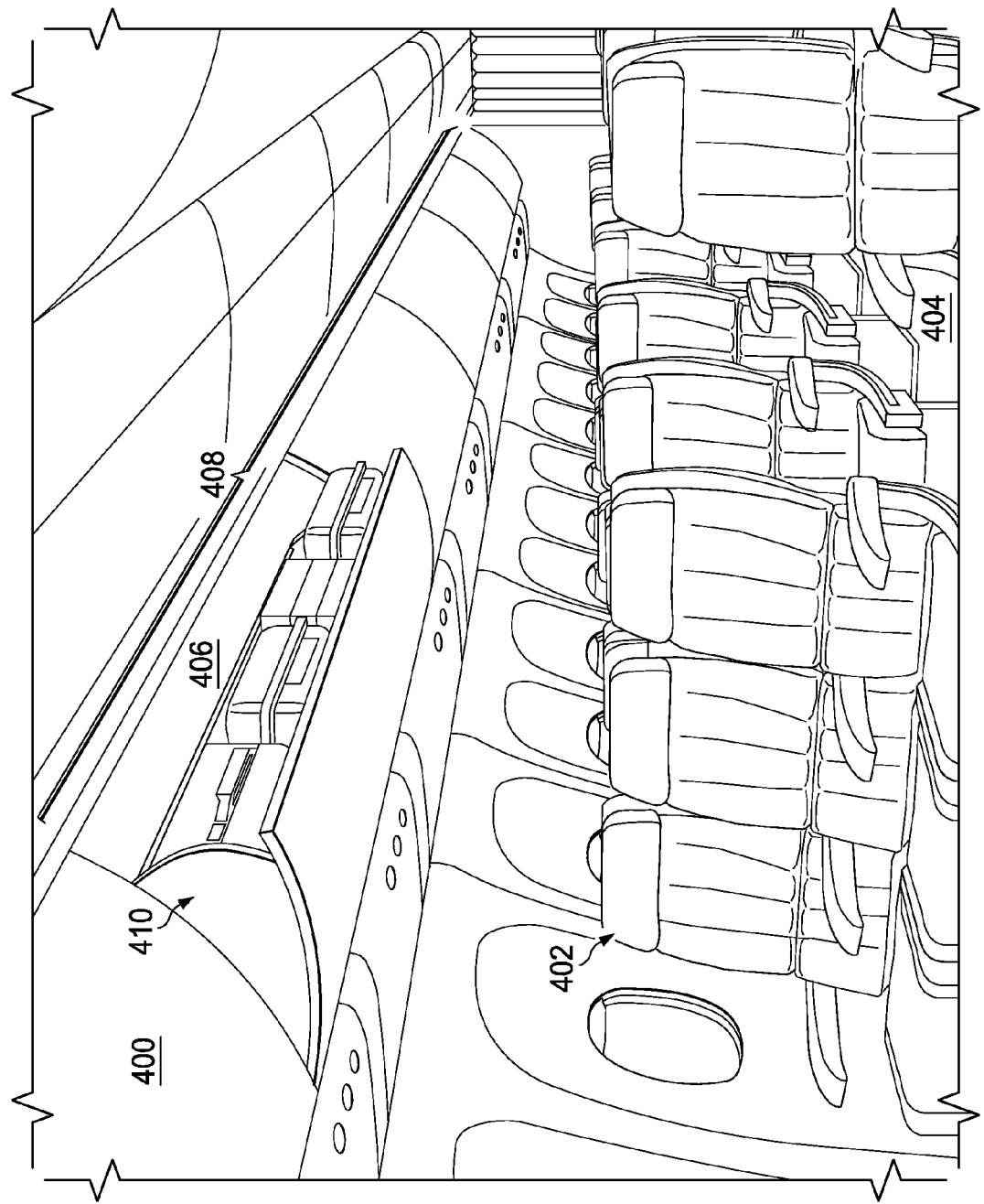
FIG. 4 is an illustration of a portion of a cabin in accordance with an advantageous embodiment.

With reference now to FIG. 4, an illustration of a portion of a cabin is depicted in accordance with an advantageous embodiment. As illustrated, cabin 400 is an example of one implementation of cabin 302 in FIG. 3. Cabin 400 may be found in an aircraft, such as aircraft 200 in FIG. 2. In this example, cabin 400 may include seats 402 and aisle 404. Overhead storage 406 may be located over seats 402.

In these examples, overhead storage 406 may comprise bin units 408. As depicted, bin unit 410 in bin units 408 may be an example of one implementation of bin unit 308 in FIG. 3.

Figure 5:
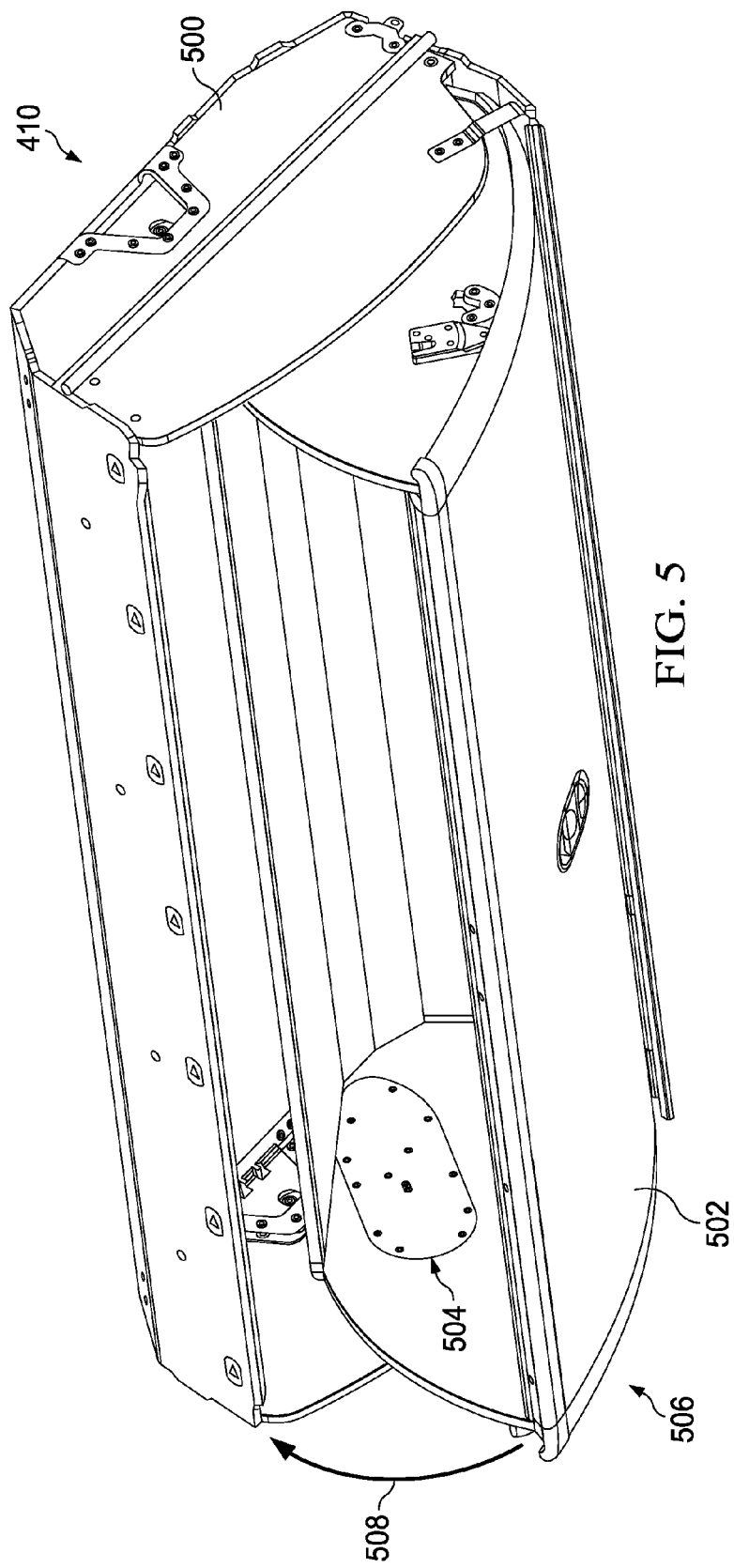
FIG. 5 is an illustration of a bin unit in accordance with an advantageous embodiment.

With reference now to FIG. 5, an illustration of a bin unit is depicted in accordance with an advantageous embodiment. In this example, bin unit 410 is illustrated in a perspective view. Bin unit 410 may include bin housing 500, bin 502, and assistance system 504. As depicted, bin 502 may be in open position 506. Assistance system 504 may aid the movement of bin 502 in the direction of arrow 508 into a closed position (not shown).

Figure 6:
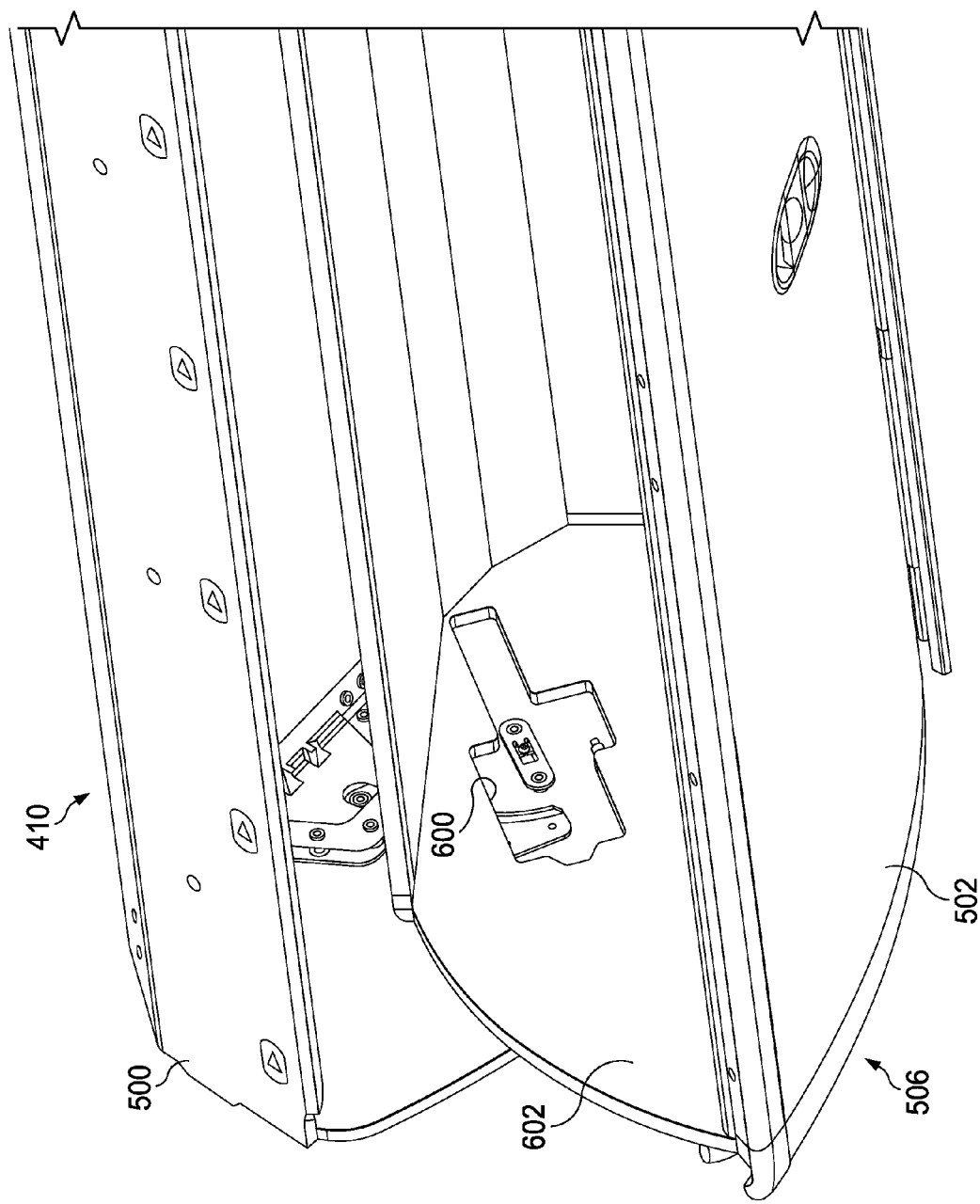
FIG. 6 is an illustration of a bin unit without an assistance system in accordance with an advantageous embodiment.

With reference now to FIG. 6, an illustration of a bin unit without an assistance system is depicted in accordance with an advantageous embodiment. In this illustrative example, assistance system 504 in FIG. 5 is shown removed from bin unit 410. As depicted, opening 600 may be formed in side 602 of bin 502. Assistance system 504 in FIG. 5 may be associated with opening 600 in side 602.

Figure 7:
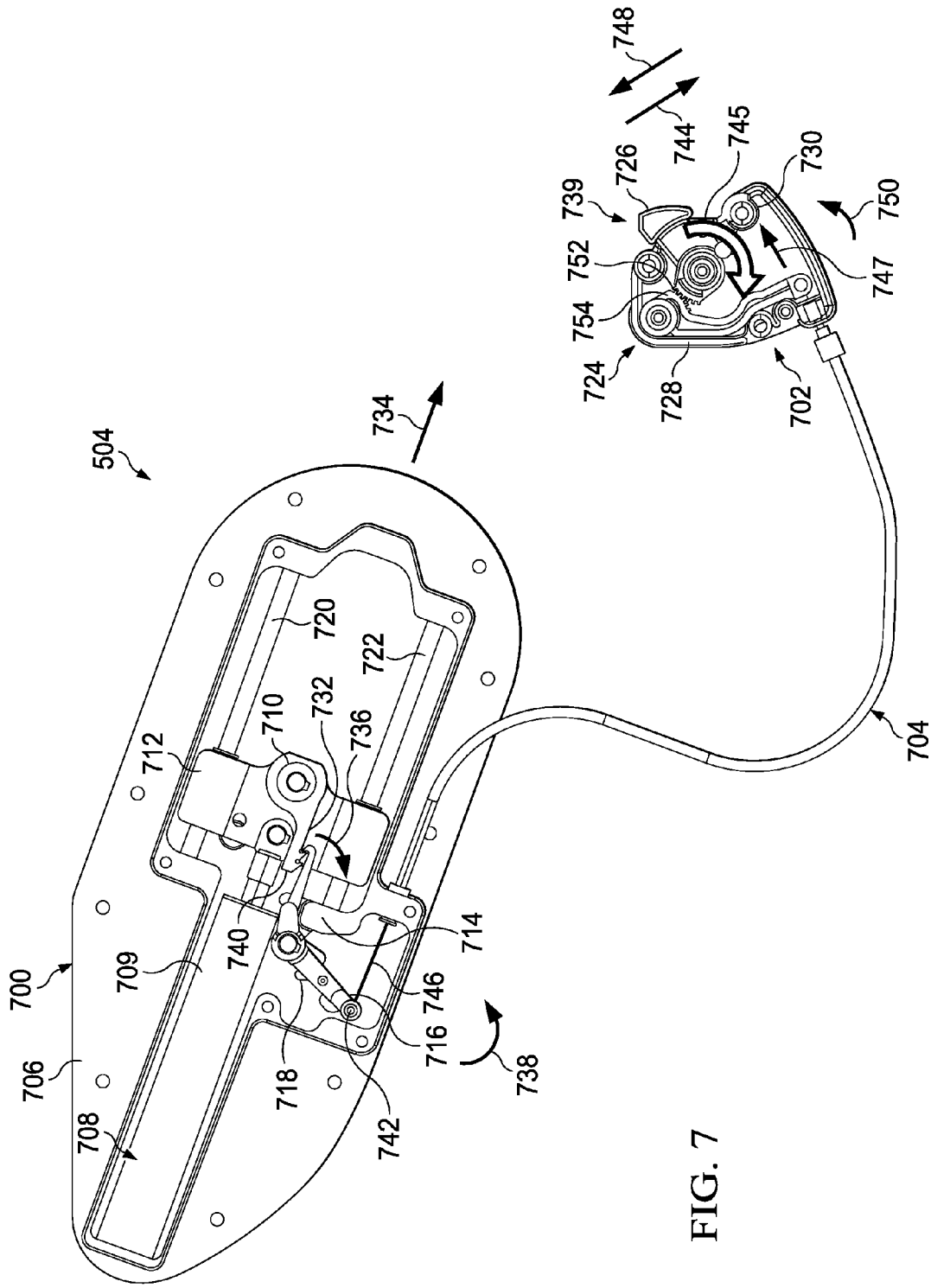
FIG. 7 is an illustration of an assistance system in accordance with an advantageous embodiment.

With reference now to FIG. 7, an illustration of an assistance system is depicted in accordance with an advantageous embodiment. In this illustrative example, a more-detailed illustration of assistance system 504 is depicted. Assistance system 504 is depicted without bin 502 or bin housing 500 from FIG. 5.

In this example, assistance system 504 may include biasing system 700 and switch 702. As depicted, biasing system 700 may be connected to switch 702 by cable 704. Additionally, biasing system 700 also may include biasing unit 708, bearing member 710, carriage 712, pawl 714, elongate member 716, spring 718, rod 720, and rod 722.

In this example, biasing system 700 may include housing 706. In this example, biasing unit 708 may take the form of gas spring 709. In other illustrative examples, biasing unit 708 may be a mechanical spring or some other suitable biasing unit.

As depicted, switch 702 may include housing 724 with actuator 726, elongate member 728, and spring 730. In this illustrative example, switch 702 may be manipulated by an operator, such as, for example, a cabin crew member.

In these illustrative examples, bearing member 710 may have ratchet 732 extending outward from bearing member 710. Ratchet 732 may be connected to carriage 712, in this illustrative example, such that ratchet 732 moves with carriage 712.

As depicted, pawl 714 may engage ratchet 732. The engagement may prevent biasing unit 708 from moving carriage 712 along rods 720 and 722 in the direction of arrow 734. Movement of carriage 712 may move bearing member 710 in the direction of arrow 734.

In this illustrative example, biasing unit 708 may be activated to move carriage 712 in the direction of arrow 734 to provide assistance in closing bin 502 in FIG. 5. In these examples, biasing unit 708 may move carriage 712 in the direction of arrow 734 when pawl 714 disengages from ratchet 732. Pawl 714 may move in the direction of arrow 736 when elongate member 716 is moved in the direction of arrow 738 and a selected amount of weight is present in bin 502. Spring 718 may bias pawl 714 to engage ratchet 732. In this illustrative example, elongate member 716 may take the form of a bi-stable selector.

Movement of elongate member 716 in the direction of arrow 738 may allow for pawl 714 to become disengaged from ratchet 732 when the selected amount of weight is present in bin 502. In these illustrative examples, if ratchet 732 is not in position 740, pawl 714 may not become disengaged from ratchet 732 even though elongate member 716 moves in the direction of arrow 738.

In these illustrative examples, cable 704 may be connected to end 742 of elongate member 716. Cable 704 may move elongate member 716 in the direction of arrow 738 in response to a manipulation of switch 702. In this example, actuator 726 of switch 702 may be in position 739. Actuator 726 may be moved from position 739 in the direction of arrow 744 towards a second position (not shown).

Movement of actuator 726 in the direction of arrow 744 may cause movement of elongate member 728 in the direction of arrow 747. In these examples, an operator, such as a cabin crew member, may manipulate switch 702 to move actuator 726 in the direction of arrow 745.

This movement of actuator 726 may cause the movement of wire 746 in cable 704 in the direction of arrow 747. Spring 730 may be configured to stabilize the position of actuator 726 in either position 739 or the second position to which actuator 726 may be moved.

In this illustrative example, the movement of actuator 726 in the direction of arrow 745 may cause elongate member 728 to move in the direction of arrow 747. Actuator 726 may include teeth 752, which may engage teeth 754 on elongate member 728.

Figure 8:
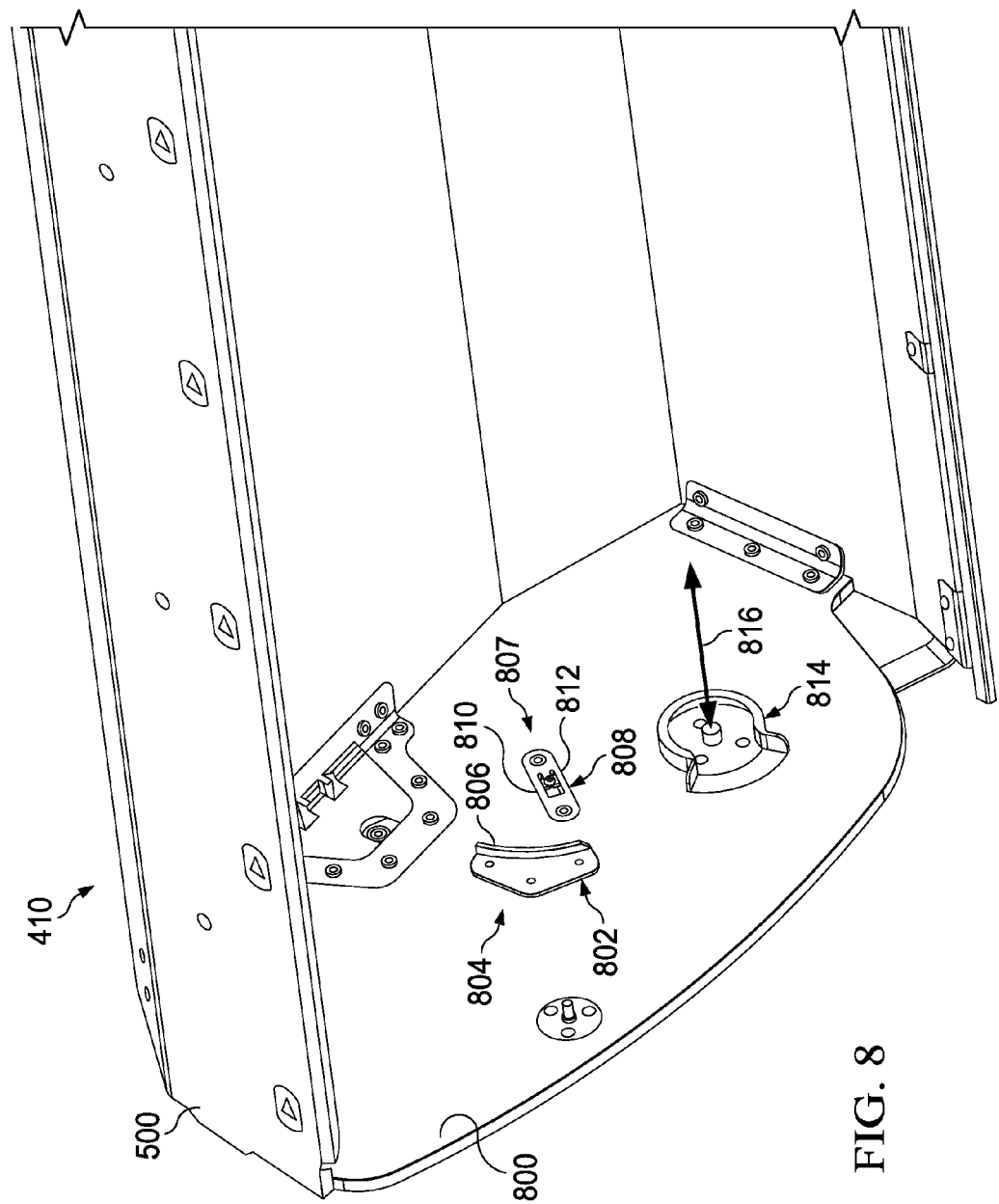
FIG. 8 is an illustration of a portion of a housing without a bin in accordance with an advantageous embodiment.

With reference now to FIG. 8, an illustration of a portion of a housing is depicted without a bin in accordance with an advantageous embodiment. In this illustrative example, side 800 of bin housing 500 may be seen. Cam 802 may be attached to side 800 of bin housing 500. Further, cam 802 may form portion 804 of housing 706 in FIG. 7. Bearing member 710 in FIG. 7 may push against surface 806 of cam 802 to generate force.

Additionally, reset mechanism 807 may be associated with side 800 of bin housing 500. Reset mechanism 807 may include housing 808 associated with side 800 of bin housing 500. Reset mechanism 807 may include pin 810 and spring 812. As illustrated, pivot 814 may be the structure about which bin 502 in FIG. 5 may rotate. In other words, bin 502 may rotate about axis 816 through pivot 814.

Figure 9:
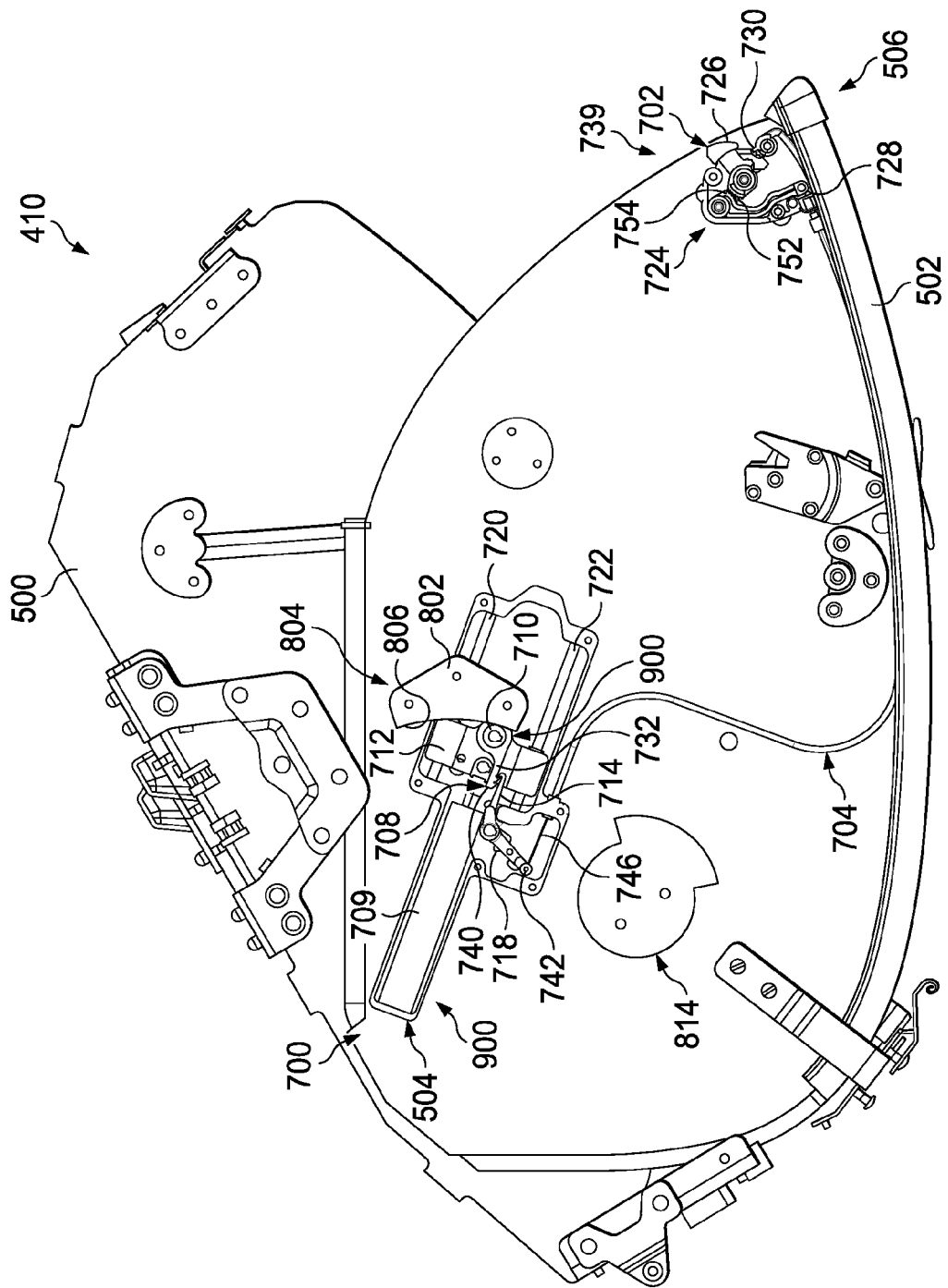
FIG. 9 is an illustration of a bin unit in an open position in accordance with an advantageous embodiment.

With reference now to FIG. 9, an illustration of a bin unit in an open position is depicted in accordance with an advantageous embodiment. In this illustrative example, bin unit 410 is depicted with bin 502 in open position 506. Bin unit 410 may be seen with assistance system 504.

In this illustrative example, switch 702 may be in position 739. In other words, assistance system 504 may be turned off. However, manipulation of switch 702 may be performed to activate assistance system 504.

As depicted in this illustrative example, bearing member 710 may be in position 900 with respect to cam 802.

Figure 10:
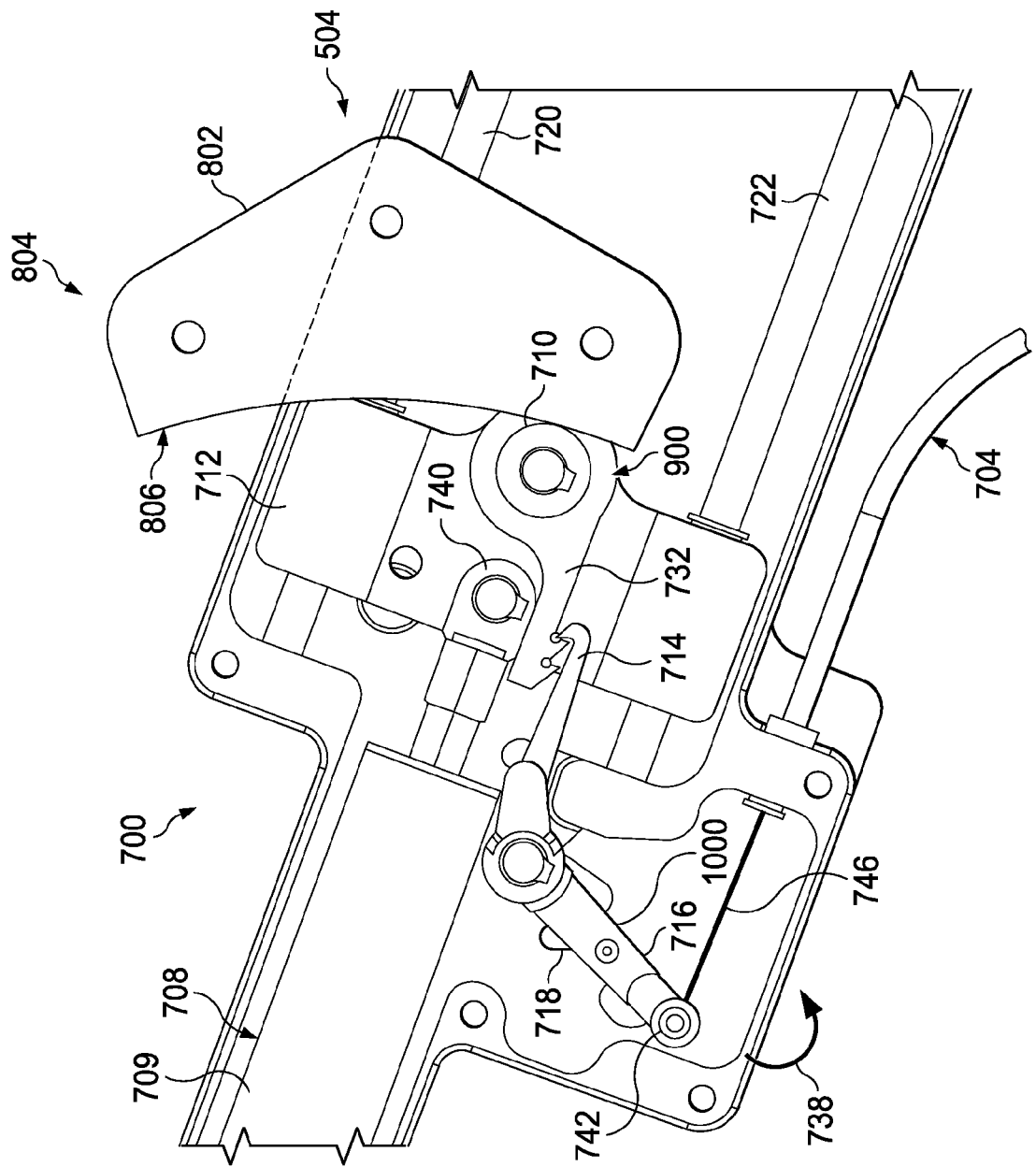
FIG. 10 is an illustration of a portion of an assistance system in accordance with an advantageous embodiment.

With reference now to FIG. 10, an illustration of a portion of an assistance system is depicted in accordance with an advantageous embodiment. In this illustrative example, assistance system 504 may be seen with ratchet 732 in position 740 and elongate member 716 in position 1000 when bin 502 is in open position 506 in FIG. 5.

Further, in this illustrative example, ratchet 732 may be in position 740, and elongate member 716 may be in position 1000 when switch 702 in FIG. 7 is in position 739 in FIG. 7. As illustrated, bearing member 710 may push against surface 806 of cam 802.

Elongate member 716 may be moved from position 1000 in the direction of arrow 738 when switch 702 in FIG. 7 is moved from position 739 in FIG. 7 in the direction of arrow 744 in FIG. 7.

Figure 11:
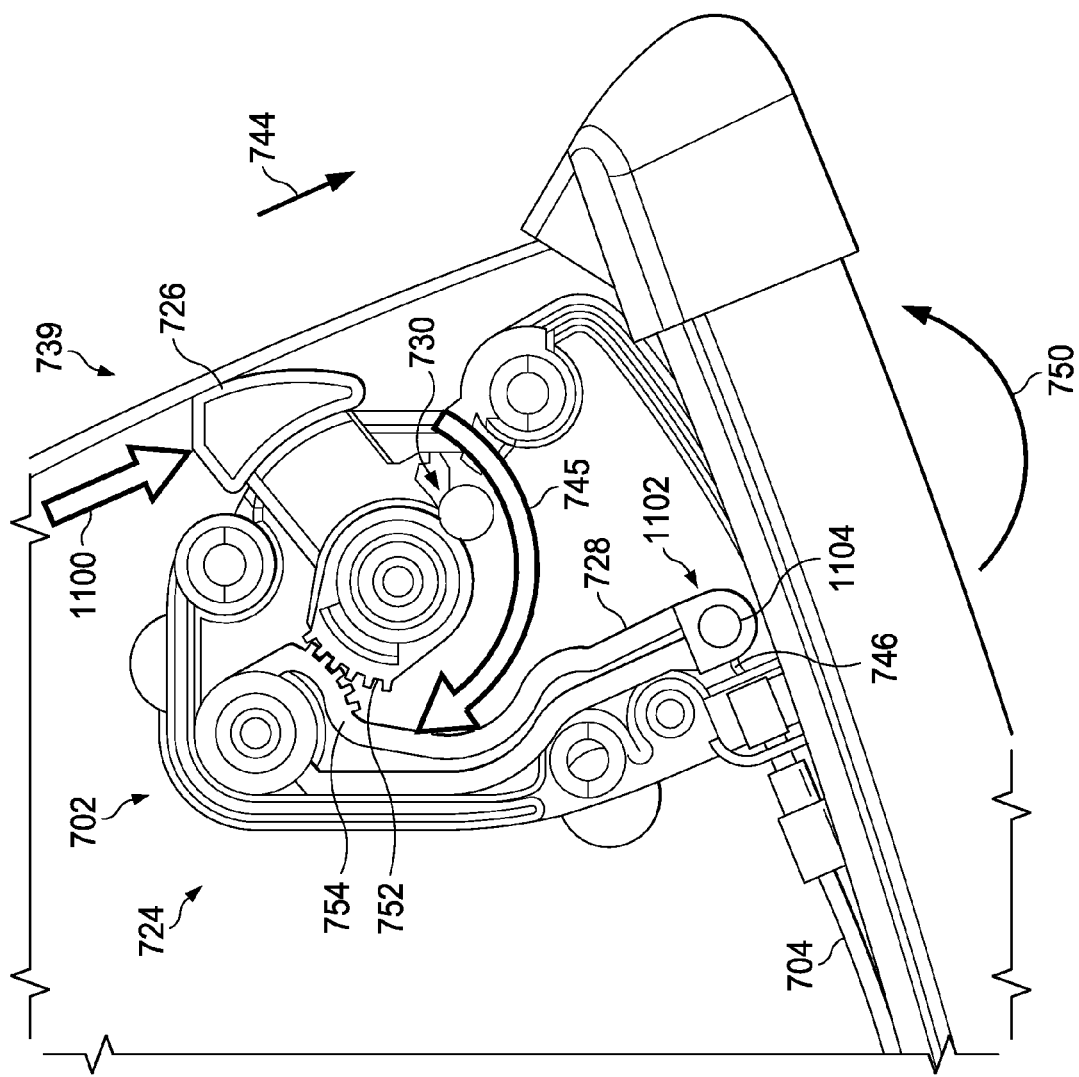
FIG. 11 is an illustration of a switch in accordance with an advantageous embodiment.

With reference now to FIG. 11, an illustration of a switch is depicted in accordance with an advantageous embodiment. In this illustrative example, switch 702 may be in position 739 when bin 502 is in open position 506 in FIG. 5. As illustrated, force 1100 may be applied to switch 702 to move switch 702 in the direction of arrow 744. Force 1100 may be applied by an operator, such as a cabin crew member.

Further, as depicted in this example, movement of switch 702 in the direction of arrow 744 may cause actuator 726 to move in the direction of arrow 745. Further, movement of actuator 726 in the direction of arrow 745 may cause elongate member 728 to move from position 1102 in the direction of arrow 750. In this illustrative example, wire 746 of cable 704 may be attached to end 1104 of elongate member 728.

Figure 12:
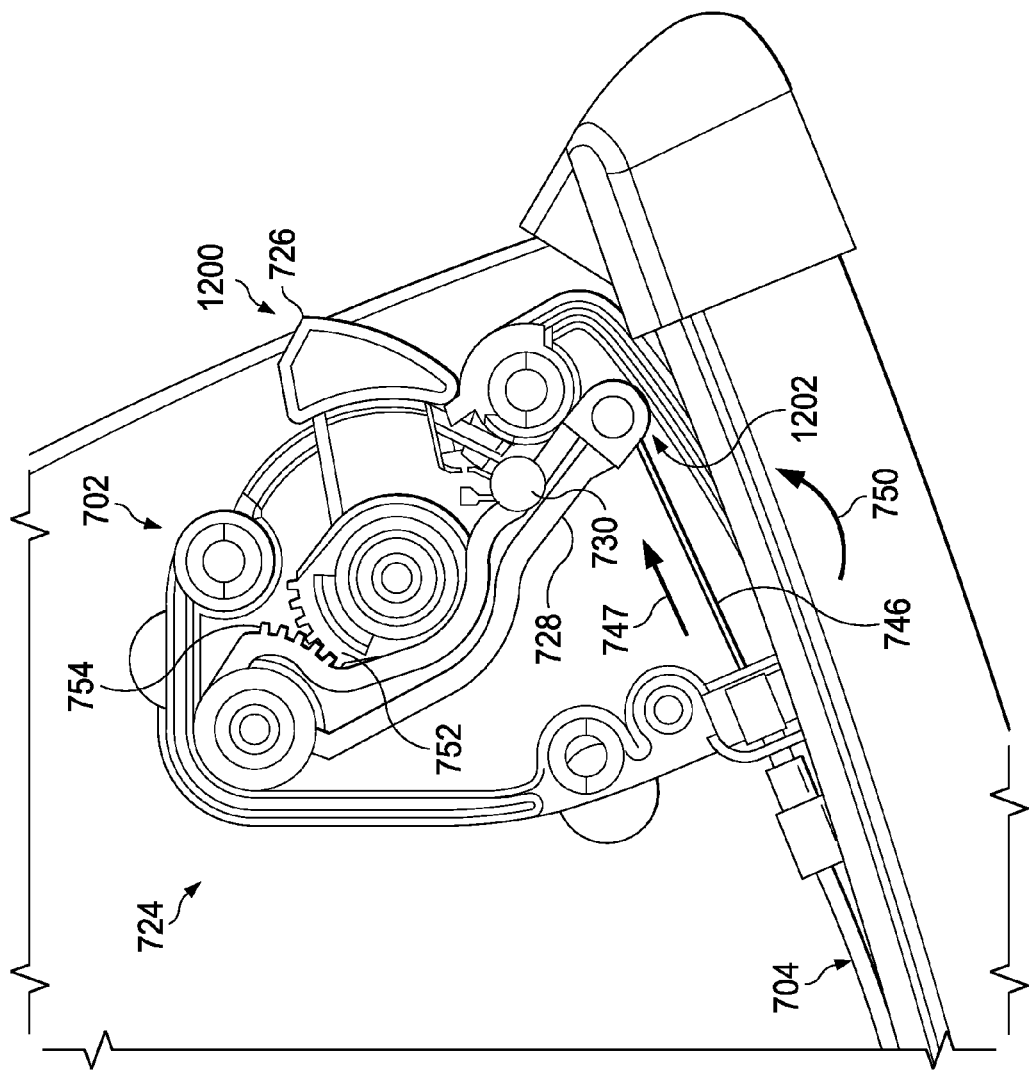
FIG. 12 is an illustration of a switch in accordance with an advantageous embodiment.

With reference now to FIG. 12, an illustration of a switch is depicted in accordance with an advantageous embodiment. In this illustrative example, switch 702 may be in position 1200. Switch 702 may be moved from position 739 in FIG. 11 to position 1200 when force 1100 in FIG. 11 is applied to switch 702.

In this depicted example, movement of switch 702 into position 1200 may cause actuator 726 to move while teeth 752 of actuator 726 engage teeth 754 of elongate member 728. As depicted, when switch 702 is moved into position 1200, elongate member 728 may be moved from position 1102 in FIG. 11 to position 1202.

Additionally, movement of end 1104 of elongate member 728 in the direction of arrow 750 may cause wire 746 to be pulled in the direction of arrow 747.

Figure 13:
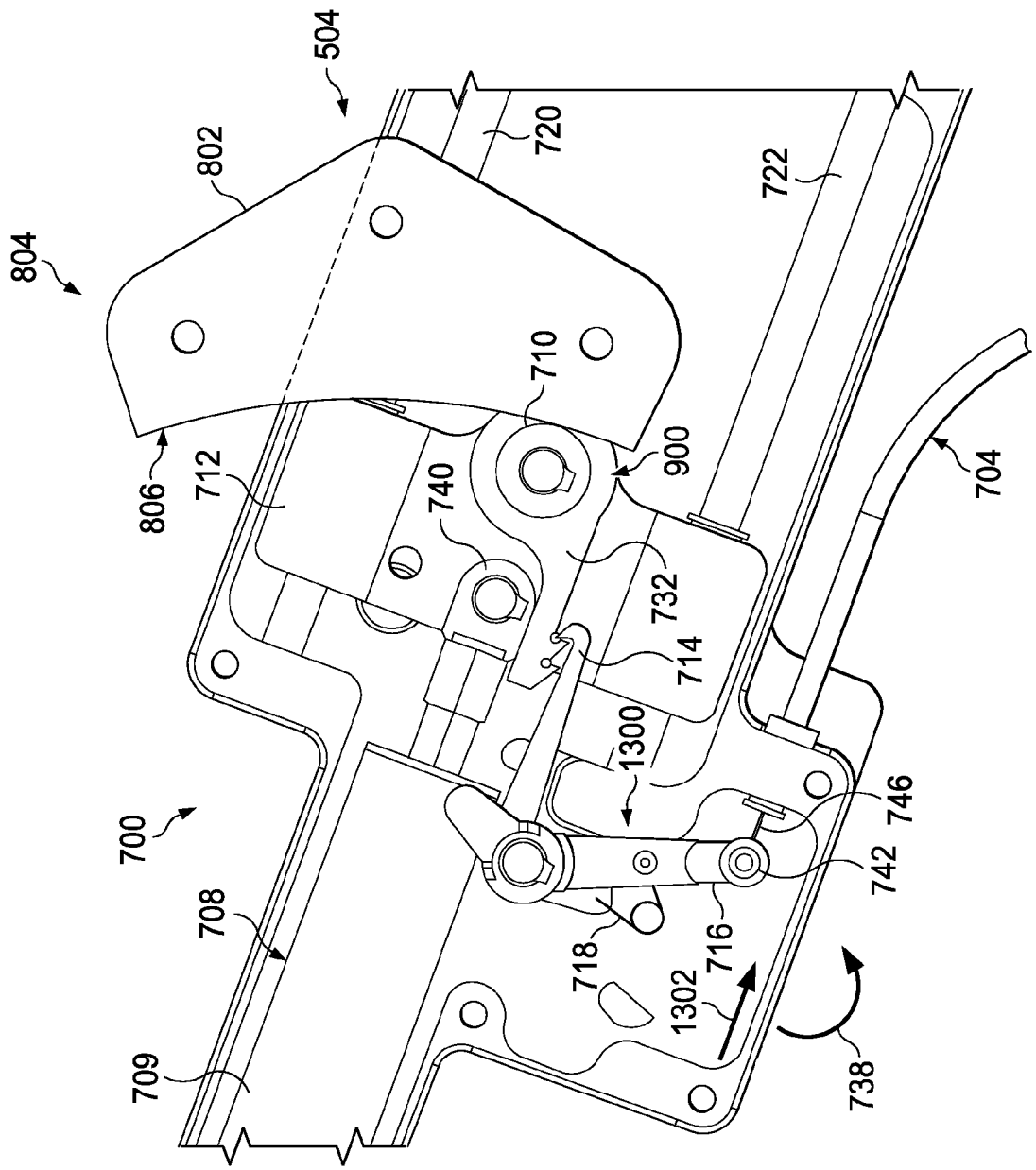
FIG. 13 is an illustration of a portion of an assistance system in accordance with an advantageous embodiment.

With reference now to FIG. 13, an illustration of a portion of an assistance system is depicted in accordance with an advantageous embodiment. In this illustrative example, elongate member 716 may be seen in position 1300. Elongate member 716 may be moved from position 1000 in FIG. 10 to position 1300 when switch 702 in FIG. 7 is moved in the direction of arrow 744 in FIG. 7.

More specifically, movement of elongate member 728 in the direction of arrow 750 in FIG. 12 to position 1202 in FIG. 12 may cause wire 746 to be pulled in the direction of arrow 1302. This movement of wire 746 may cause elongate member 716 to move in the direction of arrow 738. As depicted, pawl 714 may remain engaged with ratchet 732 until a selected amount of weight is present in bin 502.

Figure 14:
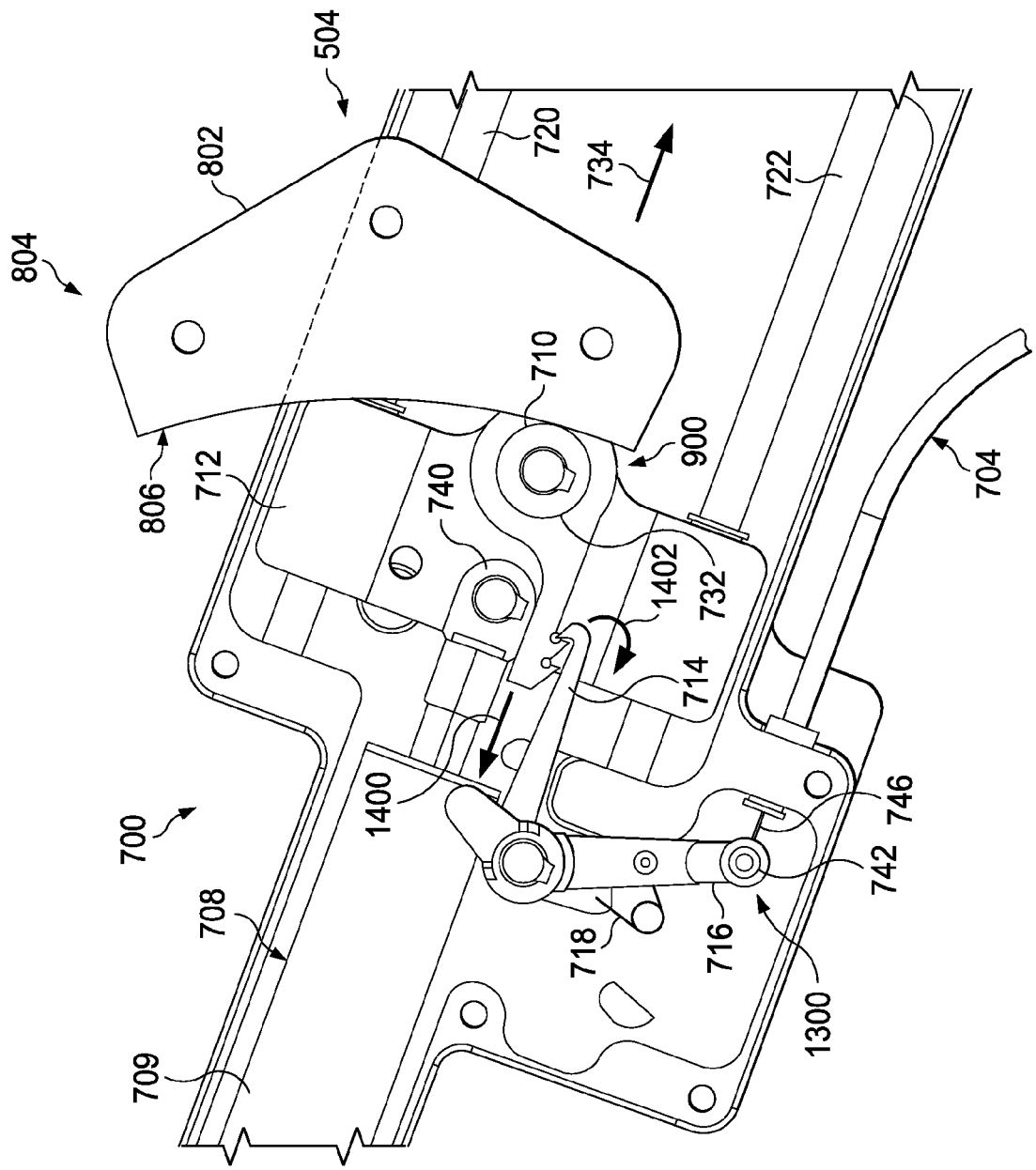
FIG. 14 is an illustration of a portion of an assistance system in accordance with an advantageous embodiment.

With reference now to FIG. 14, an illustration of a portion of an assistance system is depicted in accordance with an advantageous embodiment. In this illustrative example, a selected amount of weight may be present in bin 502 such that ratchet 732 has moved relative to pawl 714 in the direction of arrow 1400. This movement of ratchet 732 allows pawl 714 to move in the direction of arrow 1402 and disengage from ratchet 732. In this manner, ratchet 732 and carriage 712 may be released and allowed to move in the direction of arrow 734 by biasing unit 708.

Figure 15:
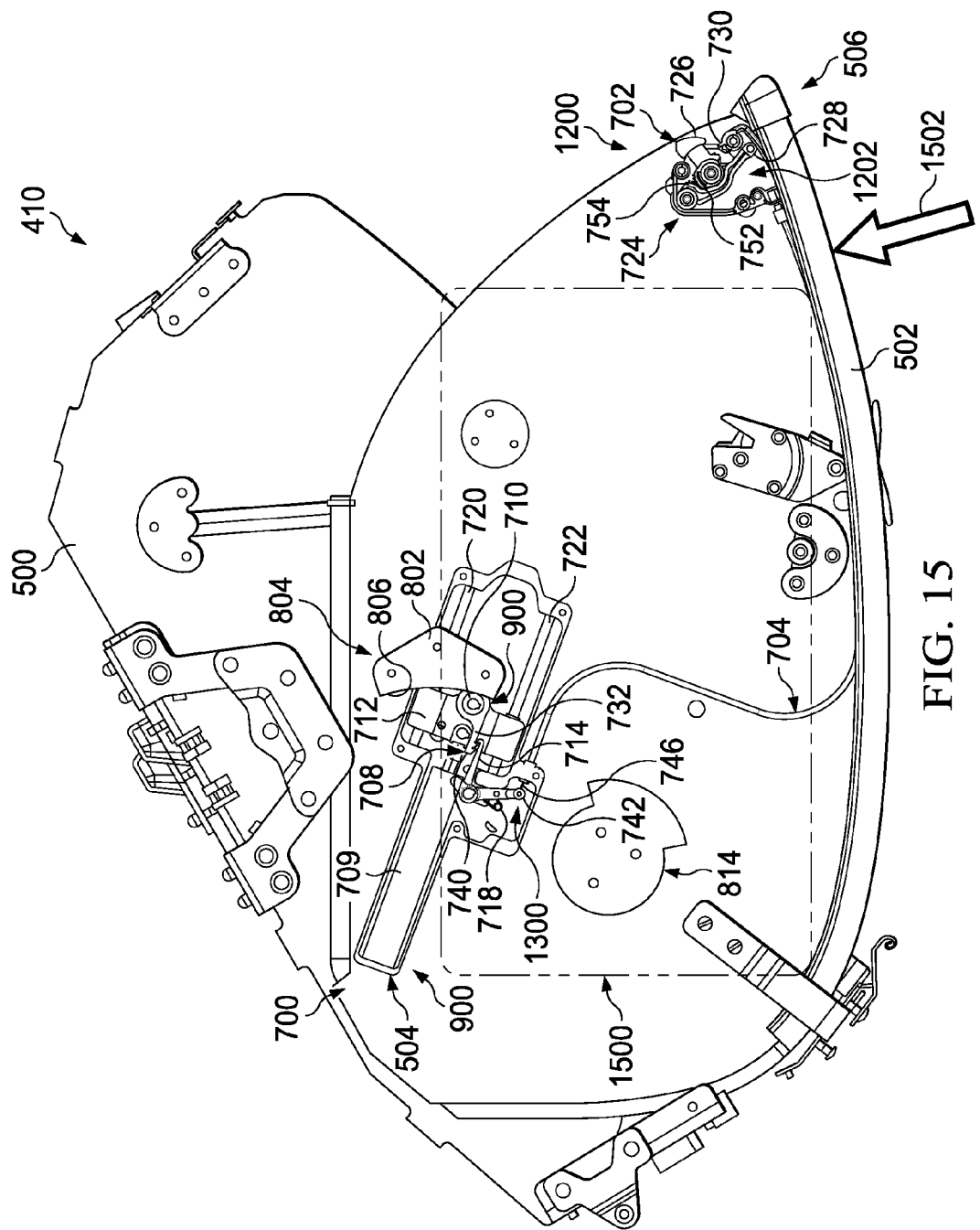
FIG. 15 is an illustration of a bin unit in accordance with an advantageous embodiment.

With reference now to FIG. 15, an illustration of a bin unit is depicted in accordance with an advantageous embodiment. In this illustrative example, switch 702 may be in position 1200. In this illustrative example, bin unit 410 may be seen with bin 502 in open position 506.

As illustrated, object 1500 may be stored in bin 502. Object 1500 may be, for example, without limitation, a piece of luggage. In this illustrative example, object 1500 may have a weight of about 104 pounds. This weight may be greater than a selected amount of weight for assistance system 504.

In this illustrative example, force 1502 may be required to close bin 502. Assistance system 504 may be configured to assist in closing bin 502. Assistance system 504 may generate force 1502 in the direction towards a closed position for bin 502. With switch 702 in position 1200 and assistance system 504 activated, about 26 pounds of force 1502 may be needed to close bin 502 as compared to about 55 pounds of force 1502 when switch 702 is in position 739 and assistance system 504 is not activated.

Figure 16:
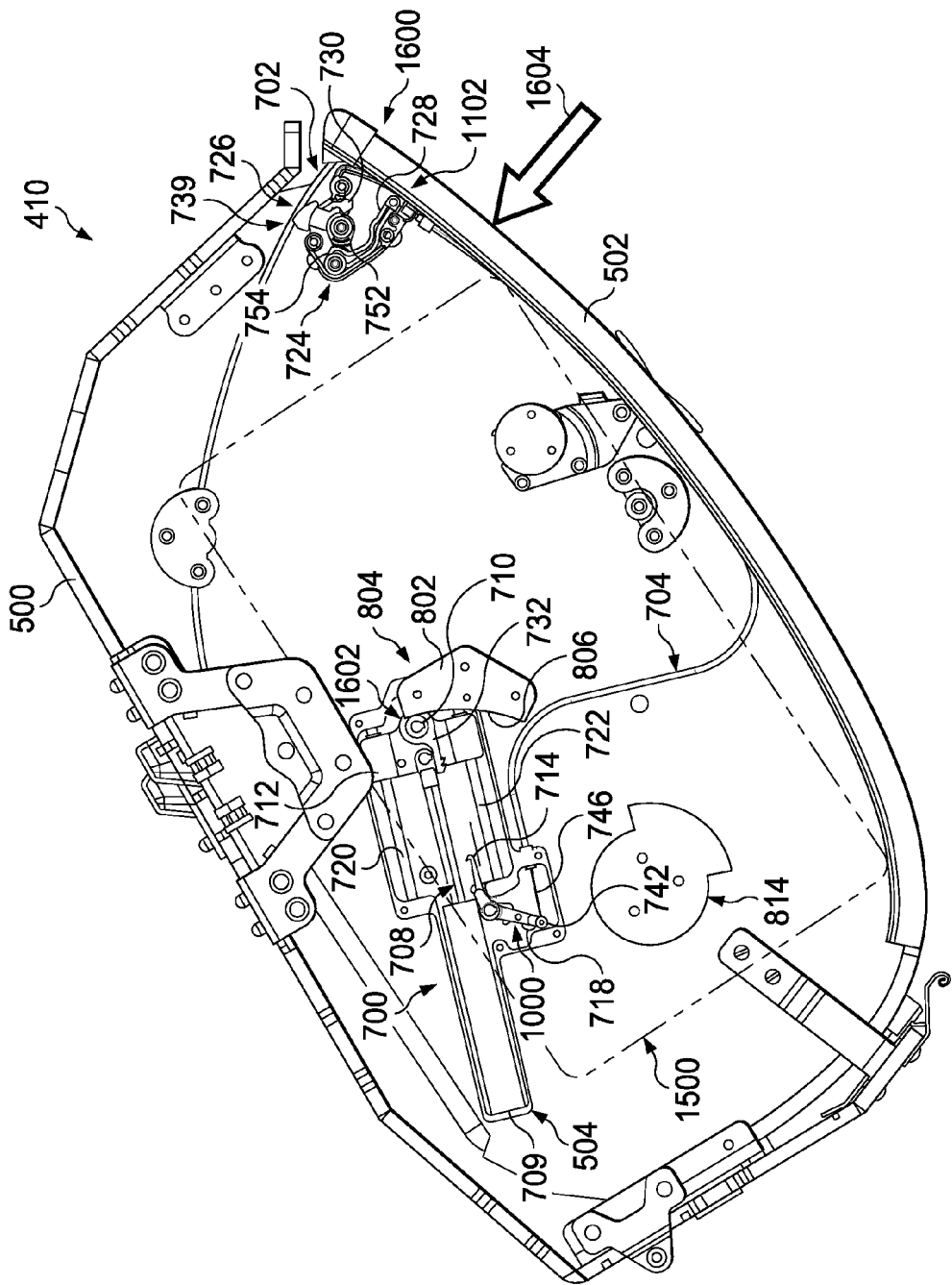
FIG. 16 is an illustration of a bin unit in accordance with an advantageous embodiment.

With reference now to FIG. 16, an illustration of a bin unit is depicted in accordance with an advantageous embodiment. In this illustrative example, bin 502 may be in closed position 1600. When bin 502 is in closed position 1600, bearing member 710 may be in position 1602 with respect to cam 802.

When bin 502 is moved from open position 506 in FIG. 15 to closed position 1600, biasing unit 708 may extend such that bearing member 710 slides along surface 806 of cam 802 from position 900 in FIG. 9 to position 1602. Bearing member 710 may push against surface 806 to generate force 1604 when bin 502 is moved from open position 506 in FIG. 15 to closed position 1600. As depicted, force 1604 may be in the direction towards closed position 1600. Force 1604 may assist in the closing of bin 502. In other words, force 1604 may assist in cam 802 providing rotation of bin 502 around pivot 814 to close bin 502. When bin 502 is opened, bearing member 710 may move back to position 900 in FIG. 9.

Additionally, switch 702 may be in position 739. Switch 702 may move from position 1200 in FIG. 12 to position 739 when bin 502 is closed.

Figure 17:
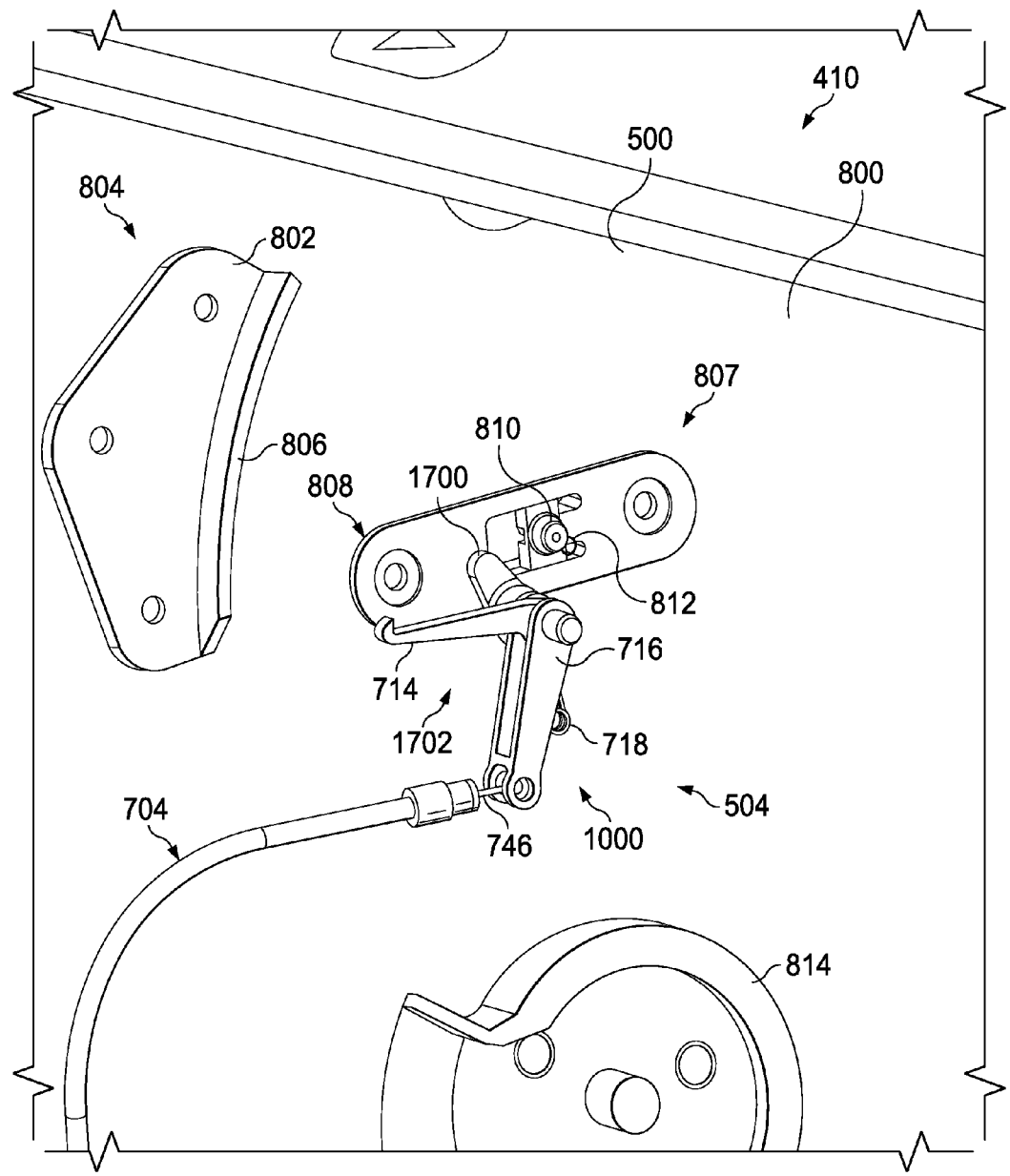
FIG. 17 is an illustration of a portion of a housing and a reset mechanism in accordance with an advantageous embodiment.

With reference now to FIG. 17, an illustration of a portion of a housing and a reset mechanism is depicted in accordance with an advantageous embodiment. In this illustrative example, reset mechanism 807 is connected to side 800 of bin housing 500. Tab 1700 of elongate member 716 may be seen in contact with housing 808 on side 800 of bin housing 500. Tab 1700 may be connected to pawl 714 of biasing system 700 in FIG. 7 in this illustrative example. As depicted, pawl 714 may be in position 1702, and elongate member 716 may be in position 1000 when bin 502 (not shown) is in open position 506 in FIG. 5.

Figure 18:
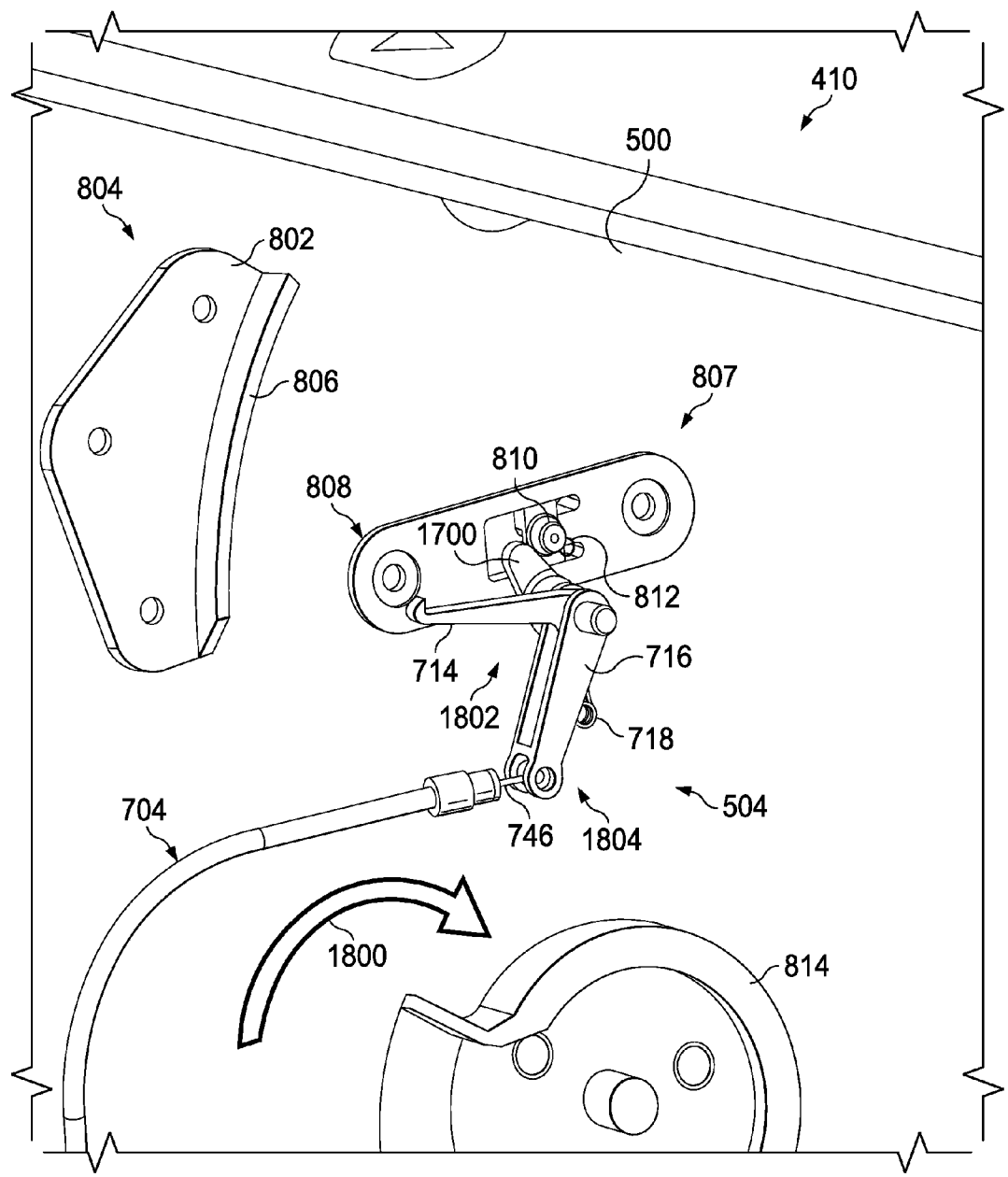
FIG. 18 is an illustration of a portion of a housing and a reset mechanism in accordance with an advantageous embodiment.

With reference now to FIG. 18, an illustration of a portion of a housing and a reset mechanism is depicted in accordance with an advantageous embodiment. In this illustrative example, bin 502 (not shown) may have been moved in the direction of arrow 1800 to begin closing bin 502. This movement may be around pivot 814. As depicted, movement of bin 502 may cause tab 1700 to come in contact with pin 810.

Figure 19:
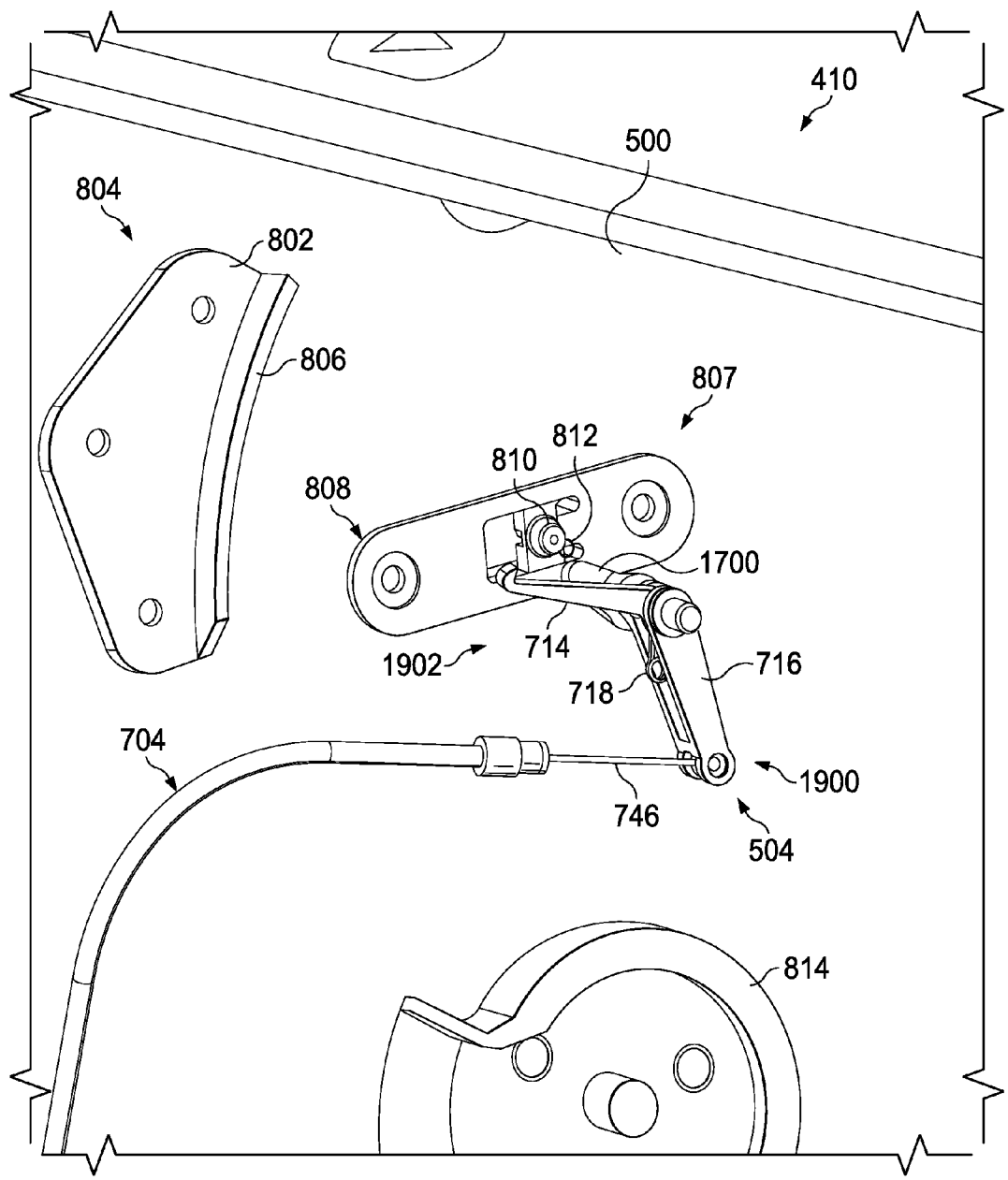
FIG. 19 is an illustration of a portion of a housing and a reset mechanism in accordance with an advantageous embodiment.

With reference now to FIG. 19, an illustration of a portion of a housing and a reset mechanism is depicted in accordance with an advantageous embodiment. In this illustrative example, bin 502 (not shown) may be further rotated around pivot 814 into a closed position. As depicted, tab 1700 has passed by pin 810. The movement of tab 1700 causes elongate member 716 to move into position 1900 and pawl 714 to move into position 1902.

Figure 20:
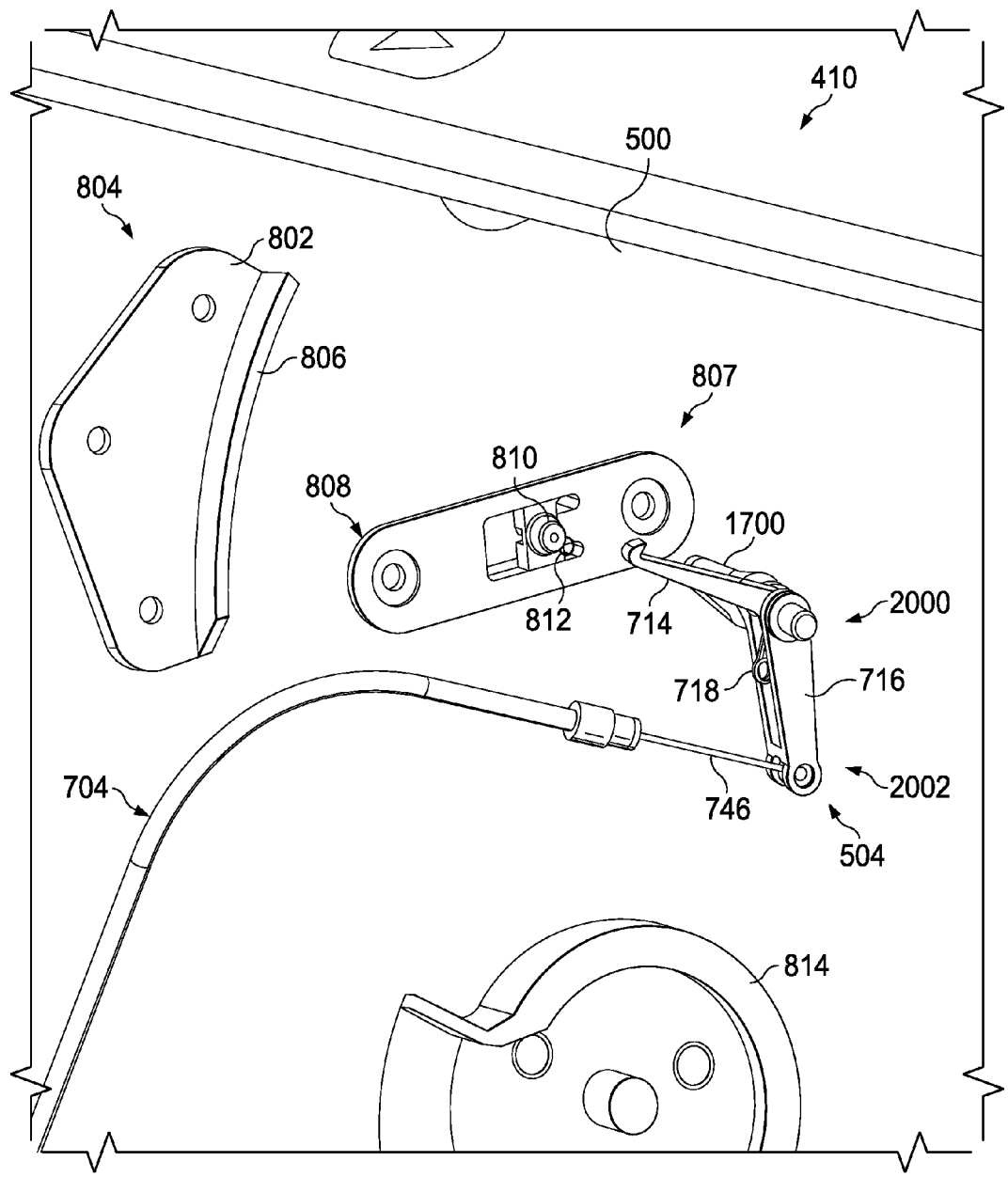
FIG. 20 is an illustration of a portion of a housing and a reset mechanism in accordance with an advantageous embodiment.

With reference now to FIG. 20, an illustration of a portion of a housing and a reset mechanism is depicted in accordance with an advantageous embodiment. In this illustrative example, bin 502 (not shown) may be in closed position 1600 as seen in FIG. 16. In this position, assistance system 504 may be reset such that pawl 714 may be in a position that will allow pawl 714 to engage ratchet 732 (not shown) when bin 502 is fully opened.

In other words, pawl 714 may be moved from position 2000 to position 1702 in FIG. 17 when bin 502 is opened.

Figure 21:
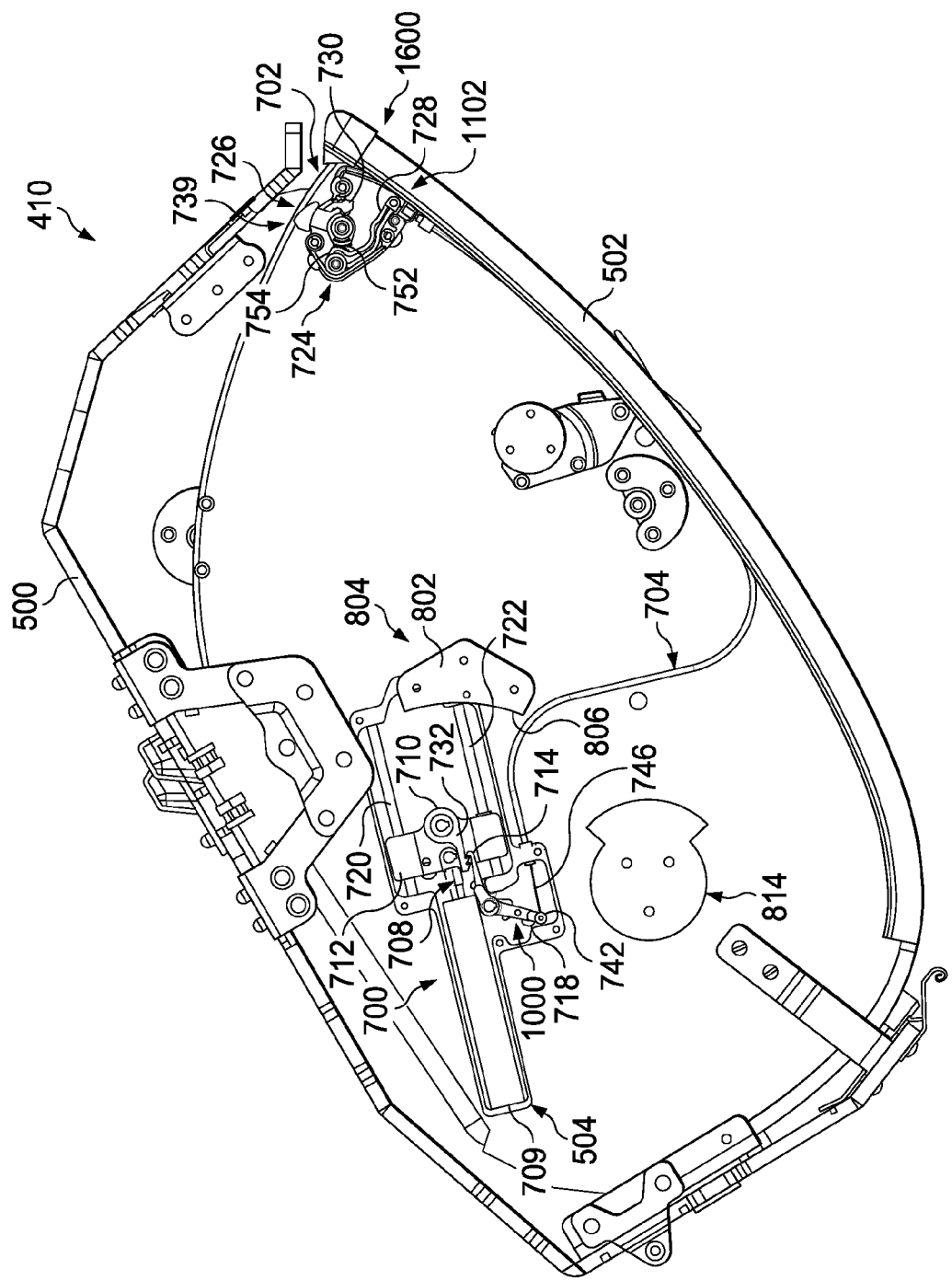
FIG. 21 is an illustration of a bin unit in accordance with an advantageous embodiment.

With reference now to FIG. 21, an illustration of a bin unit is depicted in accordance with an advantageous embodiment.

In this illustrative example, bin unit 410 may be seen with bin 502 in closed position 1600. As depicted, switch 702 has been reset to position 739.

In this illustrative example, bin 502 may be moved into closed position 1600 without activating assistance system 504. For example, without limitation, when bin 502 does not contain any objects, bin 502 may be closed without manipulating switch 702 and activating assistance system 504. In another example, switch 702 may be manipulated, and bin 502 may contain objects. However, the weight of the objects may not be sufficient to activate assistance system 504.

As depicted, when bin 502 is closed without using assistance system 504, pawl 714 may engage ratchet 732, and biasing unit 708 may not be allowed to extend. In this manner, bearing member 710 may not be allowed to push against cam 802 to generate force 1604 in FIG. 16 when cam 802 provides rotation for bin 502 about pivot 814.

Figure 22:
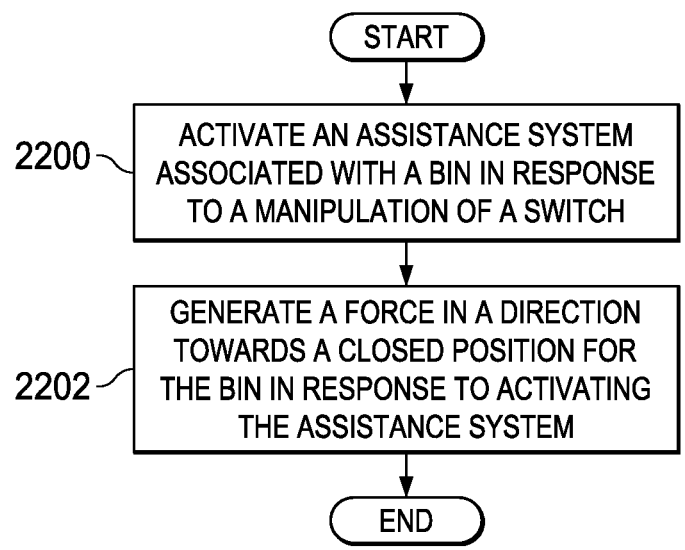
FIG. 22 is an illustration of a flowchart of a process for moving a bin in accordance with an advantageous embodiment.

With reference now to FIG. 22, an illustration of a flowchart of a process for moving a bin is depicted in accordance with an advantageous embodiment. The process illustrated in FIG. 22 may be implemented for bin unit 308 using assistance system 314 in FIG. 3. Further, this process may be implemented using assistance system 504 depicted in FIGS. 5 and 7-21.

The process may begin by activating assistance system 314 associated with bin 312 in response to a manipulation of switch 326 (operation 2200). Bin 312 may take the form of, for example, bin 502 in FIG. 5. Assistance system 314 may comprise biasing system 324 and switch 326. Biasing system 324 may be configured to be connected to bin housing 310 for bin 312. Further, biasing system 324 may be configured to generate force 325 in direction 328 towards closed position 318 for bin 312.

In these illustrative examples, switch 326 may be connected to biasing system 324. Additionally, switch 326 may be configured to activate biasing system 324 when selected amount of weight 322 is present in bin 312.

The process may then generate force 325 in direction 328 towards closed position 318 for bin 312 in response to activating assistance system 314 (operation 2202), with the process terminating thereafter.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for providing assistance in closing bins. In one advantageous embodiment, an apparatus comprises a biasing system and a switch. The biasing system is configured to be connected to a housing for a bin and generate a force in a direction towards a closed position for the bin. The switch is configured to activate the biasing system when a selected amount of weight is present in the bin.

With the different advantageous embodiments, the physical exertion of cabin crew members needed to close overhead storage bins may be reduced. Further, the assistance system provided in the different advantageous embodiments may reduce fatigue of the cabin crew members caused by having to close a number of overhead storage bins with luggage stored in the bins.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a pawl configured to activate a force that assists movement of a bin from an open position towards a closed position;
a biasing unit configured to engage a cam and generate the force;
a ratchet connected to the bin and configured to: prevent activation of the force, and move relative to a surface of the cam;
a spring configured to bias the pawl to engage the ratchet; and
a switch connected to the pawl and configured to disengage the pawl from the ratchet with the switch in an on position and a selected amount of weight present in the bin, such that the bin remains movable to the closed position with the switch in an off position.

2. The apparatus of claim 1, further comprising the pawl configured to be connected to at least one of a bin housing for the bin and the bin.

3. The apparatus of claim 1, further comprising:
a bearing member configured to slide against a portion of a bin housing for the bin; and
the biasing unit configured to move the bearing member to slide against the portion of the bin housing from a first position to a second position on the portion of the bin housing in which the force is applied on the bin in a direction towards the closed position for the bin.

4. The apparatus of claim 3, further comprising the spring biased retraction pawl configured to allow the bearing member to slide against the portion of the bin housing from the first position to the second position on the portion of the bin housing in which the force is applied on the bin in the direction to rotate the bin about an axis towards the closed position for the bin.

5. The apparatus of claim 3, wherein the portion is the cam.

6. The apparatus of claim 3, wherein movement of the bin from the closed position to the open position stores energy in the biasing unit, wherein the energy is used to move the bearing member on the portion of the bin housing.

7. The apparatus of claim 3, further comprising:
an activation system connected to the biasing unit, wherein the activation system is configured to cause the biasing unit to move the bearing member when the switch is manipulated and the selected amount of weight is present in the bin.

8. The apparatus of claim 7, wherein the activation system comprises:
an arm extending from the bearing member, wherein the arm has a particular position when the selected amount of weight is present in the bin; and a latch that is configured to disengage from the arm when the switch is manipulated and the arm is in the particular position, wherein the biasing unit is configured to move the bearing member when the latch is disengaged from the arm.

9. The apparatus of claim 8, wherein the position is a first arm position and further comprising:
a reset mechanism configured to move the latch into a second latch position after the latch is disengaged from the arm such that the latch engages the arm when the bin is moved to the open position.

10. The apparatus of claim 8 further comprising:
a housing, wherein the biasing unit and the latch are associated with the housing;
a number of rods; and
a carriage moveably connected to the number of rods, wherein the bearing member and the arm extending from the bearing member are associated with the carriage and wherein the biasing unit is connected to the carriage.

11. The apparatus of claim 1, wherein the switch is connected to the spring biased retraction pawl by a cable.

12. The apparatus of claim 11, wherein a latch is connected to the cable.

13. The apparatus of claim 12 further comprising:
an elongate member associated with the latch, wherein the latch is connected to the cable by the elongate member.

14. The apparatus of claim 1 further comprising:
a bin housing; and
the bin connected to the bin housing, wherein the bin is moveable between the open position and the closed position.

15. The apparatus of claim 1, wherein the force is a first force and wherein the first force towards the closed position for the bin moves the bin towards the closed position in conjunction with a human operator generating a second force on the bin.

16. The apparatus of claim 1, wherein the force is a first force and wherein the first force towards the closed position for the bin moves the bin towards the closed position without a human operator generating a second force on the bin.

17. An overhead storage system in an aircraft comprising:
a biasing system configured to be connected to a bin and generate a force in a direction towards a closed position for the bin in which the biasing system comprises:
a bearing member configured to slide against a cam associated with a bin housing for the bin;
a biasing unit configured to move the bearing member to slide against the cam associated with the bin housing from a first position to a second position on the cam associated with the bin housing in which the force is applied on the bin in the direction to rotate the bin about an axis towards the closed position for the bin, in which movement of the bin from the closed position to an open position stores energy in the biasing unit, and in which the energy is used to move the bearing member on the cam associated with the bin housing; and
an activation system connected to the biasing unit, in which the activation system is configured to cause the biasing unit to move the bearing member when a switch is manipulated and a selected amount of weight is present in the bin, and in which the activation system comprises:
an arm extending from the bearing member in which the arm has a position when the selected amount of weight is present in the bin; and
a latch connected to a cable by an elongate member associated with the latch in which the latch is configured to disengage from the arm when the switch is manipulated and the arm is in the position in which the biasing unit is configured to move the bearing member when the latch is disengaged from the arm;
the switch connected to the biasing system by the cable in which the switch is configured to activate the biasing system when the selected amount of weight is present in the bin;
the bin housing;
the bin connected to the bin housing in which the bin is moveable between the open position and the closed position;
a housing in which the biasing unit and the latch are associated with the housing;
a number of rods;
a carriage moveably connected to the number of rods in which the bearing member and the arm extending from the bearing member are associated with the carriage and wherein the biasing unit is connected to the carriage; and
a reset mechanism configured to move the latch to engage the arm after being disengaged from the arm when the bin is moved to the closed position;
wherein the bin is movable to the closed position without activating the biasing system.

\* \* \* \* \*